US010148778B2

(12) United States Patent
Lee et al.

(10) Patent No.: US 10,148,778 B2
(45) Date of Patent: Dec. 4, 2018

(54) ELECTRONIC DEVICE AND METHOD FOR CONTROLLING THE ELECTRONIC DEVICE

(71) Applicant: Samsung Electronics Co., Ltd., Suwon-si, Gyeonggi-do (KR)

(72) Inventors: Hae-Jun Lee, Suwon-si (KR); Deok-Ho Kim, Seoul (KR); Tae-Yeun Yang, Seoul (KR); Seung-Hak Yu, Yongin-si (KR); Ji-Hyun Rho, Seoul (KR); Ha-Yoon Jung, Seoul (KR); Ho-Jin Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/399,305

(22) Filed: Jan. 5, 2017

(65) Prior Publication Data

US 2017/0195442 A1 Jul. 6, 2017

Related U.S. Application Data

(60) Provisional application No. 62/274,963, filed on Jan. 5, 2016.

(30) Foreign Application Priority Data

Sep. 12, 2016 (KR) .................. 10-2016-0117507

(51) Int. Cl.
*H04W 4/14* (2009.01)
*H04L 29/08* (2006.01)
*H04L 29/06* (2006.01)
*H04W 4/12* (2009.01)

(52) U.S. Cl.
CPC .............. *H04L 67/26* (2013.01); *H04L 67/40* (2013.01); *H04W 4/12* (2013.01)

(58) Field of Classification Search
CPC .................................. H04W 4/12; H04W 4/14
See application file for complete search history.

(56) References Cited

U.S. PATENT DOCUMENTS

| 6,718,187 | B1 * | 4/2004 | Takagi ................... G02B 27/01 379/420.01 |
| 7,743,340 | B2 | 6/2010 | Horvitz et al. |
| 9,247,066 | B1 * | 1/2016 | Stec .................... H04M 3/5235 |
| 2001/0055963 | A1 * | 12/2001 | Cloutier .................. H04W 4/12 455/417 |
| 2004/0119740 | A1 | 6/2004 | Chang et al. |

(Continued)

FOREIGN PATENT DOCUMENTS

| EP | 1883218 A1 | 1/2008 |
| JP | 2013-093893 A | 5/2013 |

(Continued)

*Primary Examiner* — Christopher M Brandt
(74) *Attorney, Agent, or Firm* — Jefferson IP Law, LLP

(57) ABSTRACT

An electronic device and a method for controlling the electronic device are provided. The electronic device includes a communication interface configured to receive a message, at least one processor configured to determine a notification scheme for outputting the message based on status information about the electronic device and obtain a summary message by converting the message according to the notification scheme, and an output module for outputting the summary message.

20 Claims, 23 Drawing Sheets

(56) References Cited

U.S. PATENT DOCUMENTS

| | | |
|---|---|---|
| 2005/0038863 A1 | 2/2005 | Onyon et al. |
| 2005/0195856 A1 | 9/2005 | Jun |
| 2008/0186385 A1* | 8/2008 | O .................... H04M 1/274525 348/207.99 |
| 2008/0243619 A1* | 10/2008 | Sharman ................ G06Q 30/02 705/14.54 |
| 2008/0281922 A1* | 11/2008 | Renshaw .......... G06F 17/30719 709/206 |
| 2010/0145676 A1 | 6/2010 | Rogers |
| 2010/0184406 A1* | 7/2010 | Schrader ............. H04M 1/6091 455/411 |
| 2010/0240402 A1 | 9/2010 | Wickman et al. |
| 2013/0268839 A1 | 10/2013 | Lefebvre et al. |
| 2014/0258883 A1 | 9/2014 | Duarte et al. |

FOREIGN PATENT DOCUMENTS

| | | |
|---|---|---|
| KR | 10-2002-0006323 A | 1/2002 |
| KR | 10-0701519 B1 | 3/2007 |

\* cited by examiner

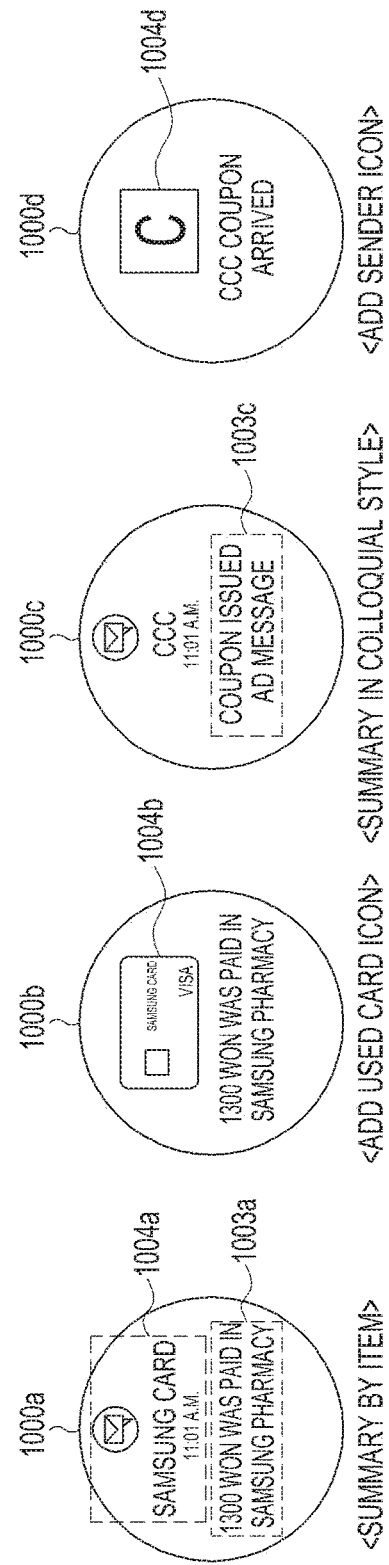

ELECTRONIC DEVICE AND METHOD FOR CONTROLLING THE ELECTRONIC DEVICE

CROSS-REFERENCE TO RELATED APPLICATION(S)

This application claims the benefit under 35 U.S.C. § 119(e) of a U.S. Provisional application filed on Jan. 5, 2016 in the U.S. Patent and Trademark Office and assigned Ser. No. 62/274,963, and under 35 U.S.C. § 119(a) of a Korean patent application filed on Sep. 12, 2016 in the Korean Intellectual Property Office and assigned Serial number 10-2016-0117507, the entire disclosure of each of which is hereby incorporated by reference.

TECHNICAL FIELD

The present disclosure relates to an electronic device. More particularly, the present disclosure relates to an electronic device for providing a notification event, and a method for controlling the electronic device.

BACKGROUND

These days, a user may call, and send and receive text messages, social networking service (SNS) messages, and e-mails through an electronic device such as a smartphone. The user may read various received messages on a display of the smartphone.

To enhance the portability of smartphones, the smartphones are miniaturized, resulting in a relatively small size of a display. If a received message contains lots of contents, all of the contents may not be displayed in the limited space of the display of a smartphone. To view all of the received message on the small display, a user might be required to manipulate the smartphone a plurality of times.

During workout, driving, or any others activity that makes it difficult to view the display, the user may view important information included in the contents of a notification event displayed on the display of the smartphone, only by selectively opening at least a part of the notification event.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for providing a summary message including important information needed for a user even in a limited size of display space, and a method for controlling the electronic device.

In accordance with an aspect of the present disclosure, an electronic device is provided. The electronic device includes a communication interface configured to receive a message, at least one processor configured to determine a notification scheme for outputting the message based on status information about the electronic device, and obtain a summary message by converting the message according to the notification scheme, and an output module configured to output the summary message.

In accordance with another aspect of the present disclosure, a method for controlling an electronic device is provided. The method includes receiving a message, determining a notification scheme for outputting the message based on status information about the electronic device, obtaining a summary message by converting the message according to the notification scheme, and outputting the summary message.

Others aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and others aspects, features, and advantages of certain embodiments of the present disclosure will be more apparent from the following description taken in conjunction with the accompanying drawings, in which:

FIGS. 10A, 10B, 10C, and 10D are views illustrating a method for determining a notification scheme according to display status information according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used in the present disclosure, 'first' and 'second' may be used to distinguish one component from another component, not limiting the components. For example, a first component may be referred to as a second component and vice versa without departing the scope of the present disclosure. The terms as used in the present disclosure are provided to describe merely specific embodiments, not intended to limit the scope of others embodiments. It is to be understood that singular forms include plural referents unless the context clearly dictates otherwise.

Figure 1:
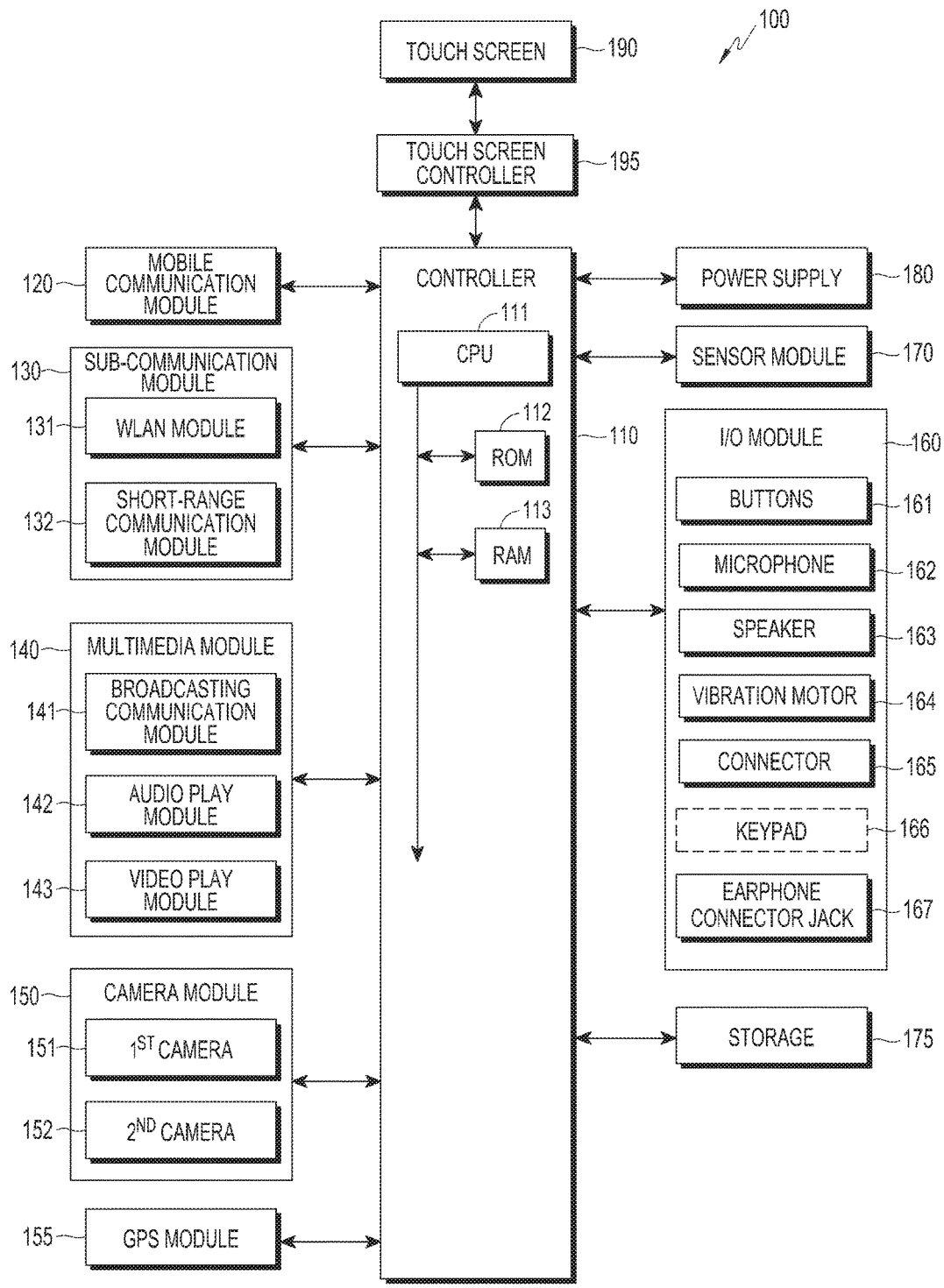
FIG. 1 is a block diagram illustrating an electronic device according to an embodiment of the present disclosure.

FIG. 1 is a block diagram of an electronic device according to an embodiment of the present disclosure.

Referring to FIG. 1, an electronic device 100 may be connected to an external device (not shown) through an external device connector such as a sub-communication module 130, a connector 165, and an earphone connector jack 167. The term "external device" covers a variety of devices that can be detachably connected to the electronic device 100 by wire, such as an earphone, an external speaker, a universal serial bus (USB) memory, a charger, a cradle, a docking station, a digital multimedia broadcasting (DMB) antenna, a mobile payment device, a health care device (for example, a blood sugar meter), a game console, a vehicle navigator, and the like. The external device may also include a device wirelessly connectable to the electronic device 100 by short-range communication, such as a Bluetooth communication device, a near field communication (NFC) device, a Wi-Fi Direct communication device, a wireless access point (AP), and the like. In addition, the external device may be any of another device, a portable phone, a smartphone, a tablet personal computer (PC), a desktop PC, a server, and the like.

Referring to FIG. 1, the electronic device 100 includes a display (e.g., a touch screen) 190 and a display controller 195. The electronic device 100 further includes a controller (e.g., a processor) 110, a mobile communication module 120, the sub-communication module 130, a multimedia module 140, a camera module 150, a global positioning system (GPS) module 155, an input/output (I/O) module 160, a sensor module 170, a storage 175, and a power supply 180. The sub-communication module 130 includes at least one of a wireless local area network (WLAN) module 131 and a short-range communication module 132, and the multimedia module 140 includes at least one of a broadcasting communication module 141, an audio play module 142, and a video play module 143. The camera module 150 includes at least one of a first camera 151 and a second camera 152. The I/O module 160 includes at least one of buttons 161, a microphone 162, a speaker 163, a vibration motor 164, the connector 165, and a keypad 166. The following description is given with the appreciation that the display 190 and the display controller 195 are a touch screen and a touch screen controller, respectively, by way of example.

The controller 110 may include a central processing unit (CPU) 111, a read only memory (ROM) 112 for storing a control program to control the electronic device 100, and a random access memory (RAM) 113 for storing signals or data received from the outside of the electronic device 100 or for use as a memory space for an operation performed by the electronic device 100. The CPU 111 may include one or more cores. The CPU 111, the ROM 112, and the RAM 113 may be interconnected through an internal bus.

The controller 110 controls the mobile communication module 120, the sub-communication module 130, the multimedia module 140, the camera module 150, the GPS module 157, the I/O module 160, the sensor module 170, the storage 175, the power supply 180, the touch screen 190, and the touch screen controller 195.

The mobile communication module 120 may connect the electronic device 100 to an external device through one or more antennas by mobile communication under the control of the controller 110. The mobile communication module 120 transmits wireless signals to or receives wireless signals from a portable phone (not shown), a smart phone (not shown), a tablet PC (not shown), or another electronic device (not shown) that has a phone number input to the electronic device 100, for a voice call, a video call, a short message service (SMS), or a multimedia messaging service (MMS).

The sub-communication module 130 includes at least one of the WLAN module 131 and the short-range communication module 132. For example, the sub-communication module 130 may include either or both of the WLAN module 131 and the short-range communication module 132.

The WLAN module 131 may be connected to the Internet under the control of the controller 110 in a place where a wireless AP is installed. The WLAN module 131 supports the WLAN institute of electrical and electronics engineers (IEEE) standard IEEE802.11x. The short-range communication module 132 conducts short-range wireless communication between the electronic device 100 and an image forming device (not shown) under the control of the controller 110. The short-range communications scheme may conform to Bluetooth, infrared data association (IrDA), Wi-Fi Direct, NFC, and the like.

The electronic device 100 includes at least one of the mobile communication module 120, the WLAN module 131, and the short-range communication module 132 according to its capabilities. For example, the electronic device 100 may include a combination of the mobile communication module 120, the WLAN module 131, and the short-range communication module 132.

The multimedia module 140 may include the broadcasting communication module 141, the audio play module 142, or the video play module 143. The broadcasting communication module 141 may receive a broadcast signal (for example, a television (TV) broadcast signal, a radio broadcast signal, or a data broadcast signal) and additional broadcasting information (for example, an electronic program guide (EPG) or electronic service guide (ESG)) from a broadcasting station through a broadcasting communication antenna under the control of the controller 110. The audio play module 142 may open a stored or received digital audio file (for example, a file having such an extension as mp3, wma, ogg, or way) under the control of the controller 110. The video play module 143 may open a stored or received digital video file (for example, a file having such an extension as mpeg, mpg, mp4, avi, mov, or mkv) under the control of the controller 110. The video play module 143 may also open a digital audio file.

The multimedia module 140 may include the audio play module 142 and the video play module 143 without the broadcasting communication module 141. The audio play module 142 or the video play module 143 of the multimedia module 140 may be incorporated into the controller 110.

The camera module 150 may include at least one of the first camera 151 and the second camera 152, for capturing a still image or a video under the control of the controller 110. The first or second camera 151 or 152 may include an auxiliary light source (for example, a flash (not shown)) for providing a light intensity required to capture an image. The first camera 151 may be disposed on the front surface of the electronic device 100, while the second camera 152 may be disposed on the rear surface of the electronic device 100. Alternatively, the first camera 151 and the second camera 152 may be arranged near to each other (for example, the distance between the first camera 151 and the second camera 152 is between 1 cm and 8 cm) in order to capture a three-dimensional still image or video.

The GPS module 155 receives radio waves from a plurality of GPS satellites (not shown) in the Earth's orbit and determines a position of the electronic device 100 based on the time of arrivals (ToAs) of satellite signals from the GPS satellites to the electronic device 100.

The I/O module 160 may include at least one of the plurality of buttons 161, the microphone 162, the speaker 163, the vibration motor 164, the connector 165, and the keypad 166.

The buttons 161 may be formed on the front surface, a side surface, or the rear surface of a housing of the electronic device 100, and may include at least one of a power/lock button (not shown), a volume button (not shown), a menu button, a home button, a back button, a search button, and so on.

The microphone 162 receives a voice or a sound and converts the received voice or sound to an electrical signal under the control of the controller 110.

The speaker 163 may output sounds corresponding to various signals (for example, a wireless signal, a broadcast signal, a digital audio file, a digital video file, and a photo shot) received from the mobile communication module 120, the sub-communication module 130, the multimedia module 140, and the camera module 150 to the outside of the electronic device 100 under the control of the controller 110. The speaker 163 may output sounds corresponding to functions (for example, a button manipulation sound or a ringback tone for a call) performed by the electronic device 100. One or more speakers 163 may be disposed at an appropriate position or positions of the housing of the electronic device 100.

The vibration motor 164 may convert an electrical signal to a mechanical vibration under the control of the controller 110. For example, when the electronic device 100 receives an incoming voice call from another device (not shown) in vibration mode, the vibration motor 164 operates. One or more vibration motors 164 may be mounted inside the housing of the electronic device 100. The vibration motor 164 may operate in response to a user's touch on the touch screen 190 and a continuous movement of the touch on the touch screen 190.

The connector 165 may be used as an interface for connecting the electronic device 100 to an external device (not shown) or a power source (not shown). The connector 165 may transmit data stored in the storage 175 to the external device via a cable connected to the connector 165 or may receive data from the external device via the cable, under the control of the controller 110. The electronic device 100 may receive power or charge a battery from the power supply via the cable connected to the connector 165.

The keypad 166 may receive a key input from the user to control the electronic device 100. The keypad 166 includes a physical keypad (not shown) formed in the electronic device 100 or a virtual keypad displayed on the touch screen 190. The physical keypad may or may not be provided according to the capabilities or configuration of the electronic device 100.

An earphone may be connected to the electronic device 100 by being inserted into the earphone connector jack 167. The sensor module 170 includes at least one sensor for detecting a state of the electronic device 100. For example, the sensor module 170 may include a proximity sensor for detecting whether the user is close to the electronic device 100, an illumination sensor (not shown) for detecting the amount of ambient light around the electronic device 100, a motion sensor (not shown) for detecting a motion of the electronic device 100 (for example, rotation, acceleration, or vibration of the electronic device 100), a geomagnetic sensor (not shown) for detecting a point of the compass using the Earth's magnetic field, a gravity sensor for detecting the direction of gravity, and an altimeter for detecting an altitude by measuring the air pressure. At least one sensor may detect a state of the electronic device 100, generate a signal corresponding to the detected state, and transmit the generated signal to the controller 110. A sensor may be added to or removed from the sensor module 170 according to the capabilities of the electronic device 100.

The storage 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The storage 175 may store a control program for controlling the electronic device 100 or the controller 110, and applications.

The term "storage" may cover the storage 175, the ROM 112 and the RAM 113 within the controller 110, or a memory card (not shown, for example, a secure digital (SD) card or a memory stick) mounted to the electronic device 100. The storage may include a non-volatile memory, a volatile memory, a hard disk drive (HDD), or a solid state drive (SSD).

The power supply 180 may supply power to one or more batteries (not shown) mounted in the housing of the electronic device 100 under the control of the controller 110. The one or more batteries supply power to the electronic device 100. Further, the power supply 180 may supply power received from an external power source (not shown) via the cable connected to the connector 165 to the electronic device 100. The power supply 180 may also supply power received wirelessly from an external power source to the electronic device 100 by a wireless charging technology.

The touch screen 190 may provide user interfaces (UIs) corresponding to various services (for example, a call, data transmission, broadcasting, and a photo shot) to the user. The touch screen 190 may transmit an analog signal corresponding to at least one touch input to a UI to the touch screen controller 195. The touch screen 190 may receive at least one touch input through a user's body part (for example, fingers including a thumb) or a touch input tool (for example, a stylus pen). The touch screen 190 may receive a continuous movement of a single touch, among one or more touches. The touch screen 190 may transmit an analog signal corresponding to a continuous movement of a touch to the touch screen controller 195.

In the present disclosure, the touch may include a non-contact touch (for example, where a detectable gap between the touch screen 190 and the user's body part or a touch input tool is 1 mm or less), and is not limited to contacts between the display 190 and the user's body part or the touch input tool. The detectable gap to the touch screen 190 may vary according to the capabilities or configuration of the electronic device 100.

The touch screen 190 may be implemented as, for example, a resistive type, a capacitive type, an infrared type, or an acoustic wave type.

The touch screen controller 195 converts an analog signal received from the touch screen 190 to a digital signal (X and Y coordinates) and transmits the digital signal to the controller 110. The controller 110 may control the touch screen 190 using the digital signal received from the touch screen controller 195. For example, the controller 110 may select or execute a shortcut icon (not shown) displayed on the touch screen 190 in response to a touch. The touch screen controller 195 may be incorporated into the controller 110.

Figure 2:
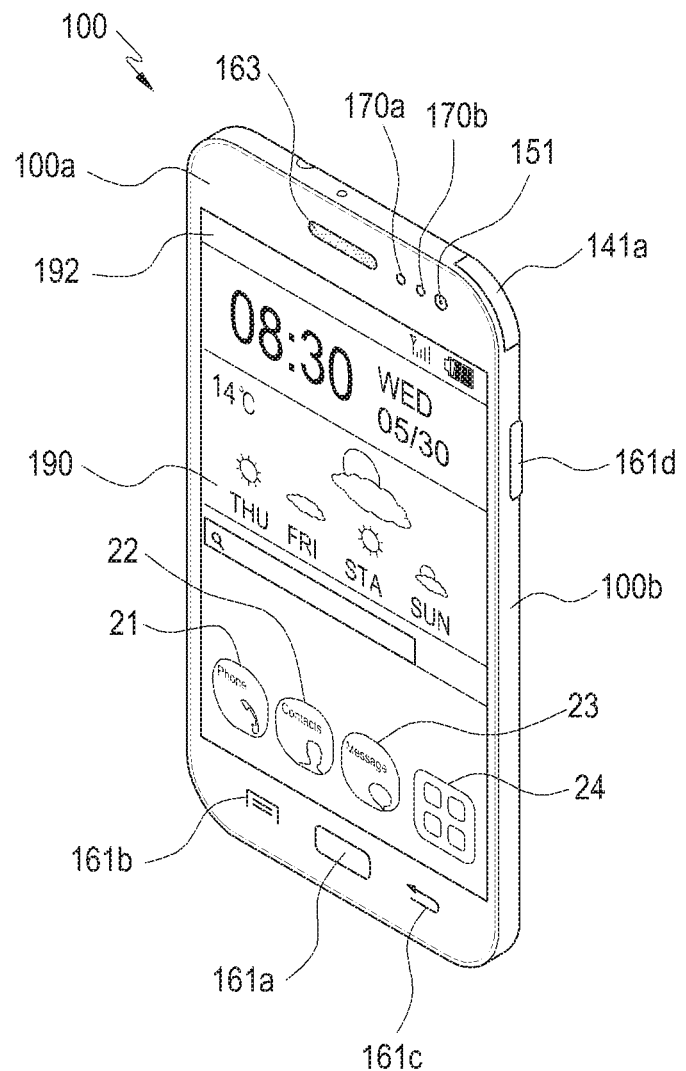
FIG. 2 is a front perspective view of an electronic device according to an embodiment of the present disclosure.
Figure 3:
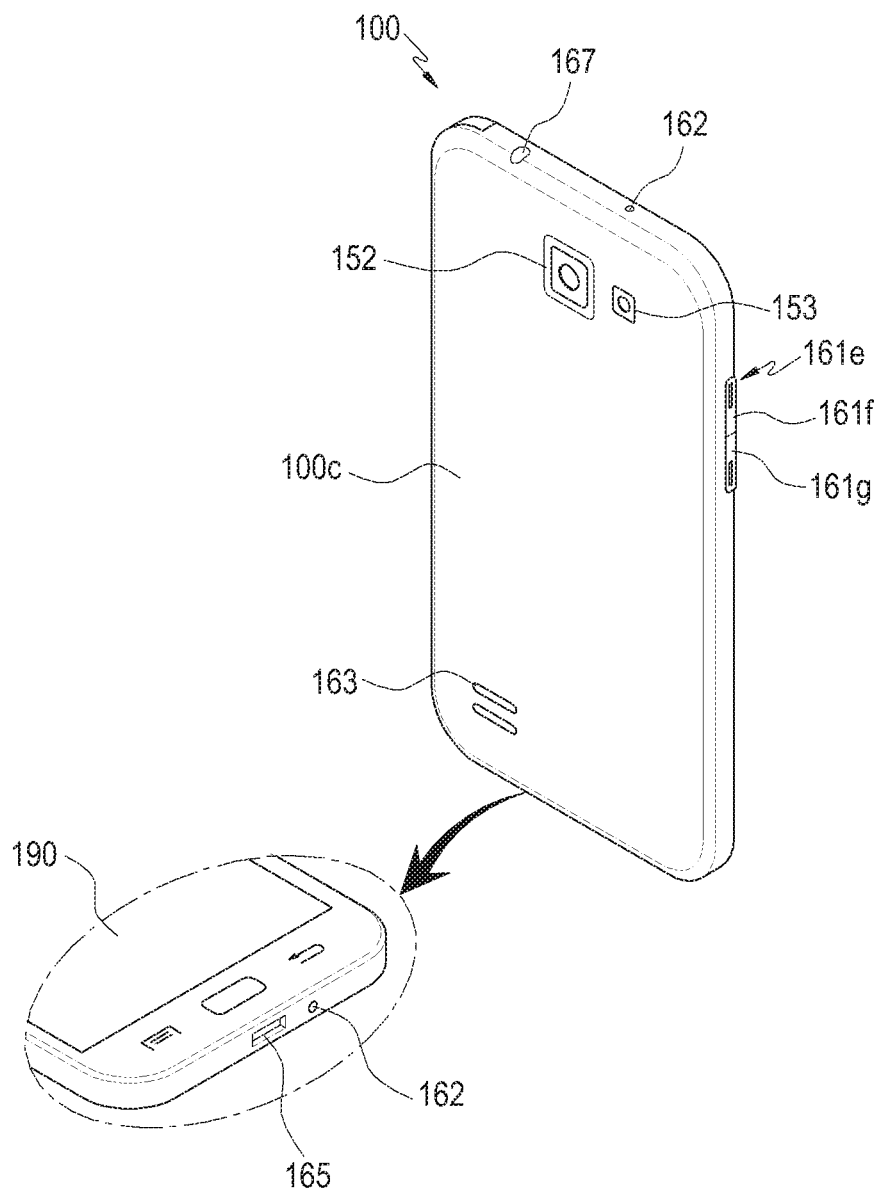
FIG. 3 is a rear perspective view of an electronic device according to an embodiment of the present disclosure.

FIGS. 2 and 3 are front and rear perspective views of an electronic device respectively according to various embodiments of the present disclosure.

Referring to FIGS. 2 and 3, the touch screen 190 is disposed at the center of the front surface 100a of the electronic device 100, occupying almost the entirety of the front surface 100a. In FIG. 2, a main home screen is displayed on the touch screen 190, by way of example. The main home screen is the first screen to be displayed on the touch screen 190, when the electronic device 100 is powered on. In the case where the electronic device 100 has different home screens of a plurality of pages, the main home screen may be the first of the home screens of the plurality of pages. Shortcut icons 21, 22, and 23 for executing frequently used applications, a main menu switch key 24, the time, the weather, and the like may be displayed on the home screen. The main menu switch key 24 is used to display a menu screen on the touch screen 190. A status bar 192 may be displayed at the top of the touch screen 190 in order to indicate states of the electronic device 100 such as a battery charged state, a received signal strength, and a current time.

A home button 161a, a menu button 161b, and a back button 161c may be formed at the bottom of the touch screen 190.

The home button 161a is used to display the main home screen on the touch screen 190. For example, upon touching of the home button 161a while any home screen others than the main home screen or a menu screen is displayed on the touch screen 190, the main home screen may be displayed on the touch screen 190. Upon touching of the home button 161a during execution of applications on the touch screen 190, the main home screen illustrated in FIG. 2 may be displayed on the touch screen 190. The home button 161a may also be used to display recently used applications or a task manager on the touch screen 190.

The menu button 161b provides link menus available on the touch screen 190. The link menus may include a widget adding menu, a background changing menu, a search menu, an edit menu, an environment setting menu, and the like.

The back button 161c is used to display a screen previous to a current screen or end the latest used application.

The first camera 151, an illumination sensor 170a, and a proximity sensor 170b may be arranged at a corner of the front surface 100a of the electronic device 100, whereas the second camera 152, a flash 153, and the speaker 163 may be arranged on the rear surface 100c of the electronic device 100.

A power/reset button 161d, a volume button 161e, a terrestrial DMB antenna 141a for receiving a broadcast signal, and one or more microphones 162 may be disposed on side surfaces 100b of the electronic device 100. The volume button 161e may comprise a volume up (increase) button 161f and a volume down (decrease) button 161g. The DMB antenna 141a may be mounted to the electronic device 100 fixedly or detachably.

The connector 165 is formed on the bottom side surface of the electronic device 100. The connector 165 may include a plurality of electrodes and may be connected to an external device by wire. The earphone connector jack 167 may be formed on the top side surface of the electronic device 100, for allowing an earphone to be inserted.

Figure 4A:
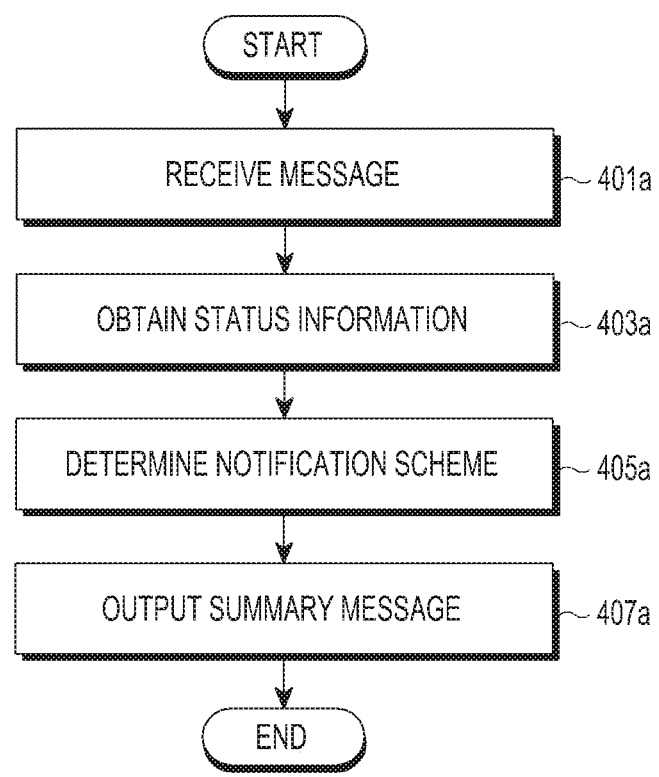
FIG. 4A is a flowchart illustrating a method for controlling an electronic device according to an embodiment of the present disclosure.

FIG. 4A is a flowchart illustrating a method for controlling an electronic device according to an embodiment of the present disclosure.

Referring to FIG. 4A, according to various embodiments, a communication interface (for example, the sub-communication module 130) of an electronic device (for example, the electronic device 100) may receive a message from the outside in operation 401*a*.

For example, the message may include at least one of a text (SMS or MMS) message, a social networking service (SNS) message, an application notice message, and an e-mail message.

For example, the message may include text with at least one character, numeral, and/or symbol.

For example, the communication interface 130 may receive a message saying "1588-0000 [XX Telecom] Enter Authentication code [67625] for Identification."

According to various embodiments, a controller (for example, the controller 110) may obtain status information about the electronic device in operation 403*a*.

For example, the status information about the electronic device may include user status information indicating the status of a user and/or display status information indicating the status of a display.

For example, the controller 110 may sense that an external device (for example, an earphone) is connected to an earphone connector jack (for example, the earphone connector jack 167). If the external device is connected to the earphone connector jack 167, the controller 110 may display a screen asking the user whether the user is working out on a display (for example, the touch screen 190), and receive an input indicating that the user is working out from the user through the touch screen 190 or the I/O module 160. Then the controller 110 may obtain user status information indicating that the user is in a "workout status" based on the sensed information indicating the connection of the external device and the received user input. In another example, the controller 110 may receive acceleration information about the electronic device 100 from the sensor module 170, and receive sensed information indicating that the external device (earphone) is connected to the earphone connector jack 167. The controller 110 may obtain user status information indicating whether the user carrying the electronic device 100 is walking or running from the accelerator information. Further, the controller 110 may determine whether an acceleration value is larger than a threshold. If determining that the acceleration value is larger than the threshold while the external device is connected to the earphone connector jack 167, the controller 110 may obtain user status information indicating that the user is "working out."

For example, if the user sets "drive mode" in an operation mode program that allows setting of an operation mode of the electronic device 100, the controller 110 may obtain user status information indicating that the user is in "driving."

For example, the controller 110 may obtain display status information indicating that a message is being displayed on the display (for example, the touch screen 190). For example, the controller 110 may obtain display status information indicating that the touch screen 190 is a "circular display." For example, the controller 110 may obtain display status information indicating that the touch screen 190 is a "rectangular display." For example, the controller 110 may obtain display status information indicating that a message is displayed in a "status bar." For example, the controller 110 may obtain display status information indicating that a message is displayed in a "notification window." A method for obtaining display status information will be described later with reference to FIG. 8A.

According to various embodiments, in operation 405*a*, the controller 110 may determine a notification scheme for notifying the user of the message based on the received message and/or the status information.

For example, the controller 110 may determine a first notification scheme and a second notification scheme to notify the user of a first message based on different senders extracted from the message. For example, the controller 110 may determine the first notification scheme to notify the user of the first message based on a first message type extracted from the first message, and the second notification scheme to notify the user of the first message based on a second message type extracted from the first message. For example, the controller 110 may determine the first notification scheme to notify the user of the first message based on first user status information, and the second notification scheme to notify the user of the first message based on second user status information. For example, the controller 110 may determine the first notification scheme to notify the user of the first message based on first display status information, and the second notification scheme to notify the user of the first message based on second display status information.

Now, a description will be given of a method for determining a notification scheme according to various embodiments with reference to Table 1.

Table 1 lists message types, status information (user status information and display status information), importance levels of senders, and notification schemes corresponding to the importance levels.

TABLE 1

| Classification | Message type | Status information | Sender | Importance level | Notification scheme |
|---|---|---|---|---|---|
| 1 | | Sleep, earphone | | Low | Ignore |
| 2 | Advertisement_discount | Earphone | | Medium | Voice |
| 3 | Advertisement | Earphone | AA | Medium | Voice |
| 4 | Instant_message | Earphone | Wife | High | Voice, Stop the others tasks |
| 5 | Instant_message | Earphone | | Medium | Voice |
| 6 | Delivery_scheduled | Earphone | | High | Voice, Stop the others tasks |

For example, status information may include information about a user status, connection information indicating whether an external device is connected, and information about the display status of a connected external device or the electronic device.

For example, the controller 110 may determine whether the external device is connected to the electronic device 100 based on the connection information about the external device. If the external device is connected to the electronic device 100, the controller 110 may obtain information about the display status of the external device, and determine a notification scheme based on the information about the display status of the external device.

For example, the controller 110 may determine that the external device is not connected to the electronic device 100, based on the connection information about the external device, obtain information about the display status of the electronic device 100 instead of the external device, and determine a notification scheme for a message based on the display status information about the electronic device 100.

As illustrated in Table 1, for example, the controller 110 may determine a message type from the message, extract status information from status information of each sensor and/or operation mode program log information in the electronic device 100, and determine a sender from a sender number of the message.

For example, the controller 110 may determine the importance level of the message to be "Low," "Medium," or "High" based on the obtained message type, status information, and/or sender.

For example, if the controller 110 fails to determine the message type, the controller 110 may determine the importance level of the message to be "Low."

For example, if the message type is determined to be "advertisement_discount," "advertisement," or "instant_message," the controller 110 may determine the importance level of the message to be "Medium."

For example, if the sender is determined to be "wife," the controller 110 may determine the importance level of the message to be "High."

For example, if the message type is determined to be "delivery_scheduled," the controller 110 may determine the importance level of the message to be "High."

For example, the controller 110 may select at least one of "ignore," "voice," and "stop the others tasks" as the notification scheme for the message, based on the determined importance level.

For example, if the importance level of the message is determined to be "Low," the controller 110 may determine "ignore" as the notification scheme for the message.

For example, if the importance level of the message is determined to be "Medium," the controller 110 may determine "voice" as the notification scheme for the message.

For example, if the importance level of the message is determined to be "High," the controller 110 may determine "voice" and "stop the others tasks" as the notification scheme for the message.

While not included in Table 1, when the display status is a "circular" display of a first size, the controller 110 may determine the length of a message to be output on the "circular" display to be smaller than when the display status is a "rectangular" display of a second size larger than the first size.

According to various embodiments, the controller 110 may convert the message to a summary message based on the notification scheme in order to output the message in the determined notification scheme in operation 407a. For example, if determining the notification scheme of the message to be "voice," the controller 110 may convert the message to a summary message of colloquial style. For example, if determining the notification scheme of the message to be "brief," the controller 110 may convert the message to a summary message including only important information of the contents of the message and output the summary message, in order to output the message in the determined notification scheme, "brief."

For example, after generating the summary message, the controller 110 may output the generated summary message through an output module (for example, the I/O module 160).

Figure 4B:
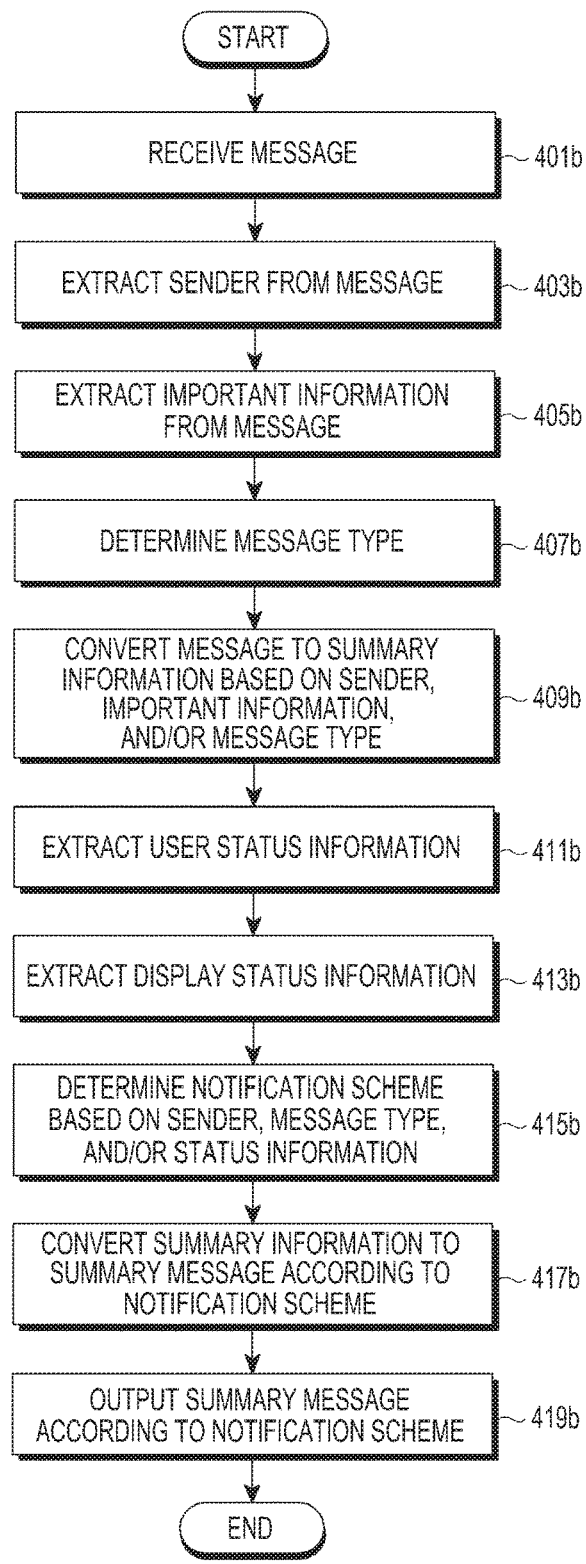
FIG. 4B is a flowchart illustrating a method for controlling an electronic device according to an embodiment of the present disclosure.

FIG. 4B is a flowchart illustrating a method for controlling an electronic device according to an embodiment of the present disclosure.

According to various embodiments, an electronic device (for example, the electronic device 100) may receive a message from the outside through a communication interface (for example, the sub-communication module 130) in operation 401b.

For example, the message may be received from the outside in the same manner as in operation 401a of FIG. 4A.

According to various embodiments, a controller (for example, the controller 110) may extract a sender from the message received through the communication interface 130 in operation 403b.

For example, the controller 110 may determine a sender using a sender number of a text message. For example, regarding a message saying "1588-0000 [XX Telecom] Enter Authentication code [67625] for Identification," the sender "XX Telecom" may be extracted using the sender number of the message, "1588-0000." For example, the controller 110 may extract the sender "XX Telecom" corresponding to the sender number "1588-0000" in a sender list included in a directory database stored in a storage (for example, the storage 175) of the electronic device 100. For example, the controller 110 may detect the sender "XX Telecom" corresponding to the sender number "1588-0000" on the Internet.

For example, the controller 110 may extract a sender from another user account of an SNS message.

For example, the controller 110 may extract a sender from the name of an application which is a provider of an application notice message.

For example, the controller 110 may extract a sender from a sender account of an e-mail message.

According to various embodiments, the controller 110 may extract important information from the message in operation 405b.

For example, the controller 110 may analyze text included in the message, using a natural language analysis method for messages, and extract important information predetermined as frequently used by a user or as needed for a user, based on the analysis result of the text.

For example, regarding the message "1588-0000 [XX Telecom] Enter Authentication code [67625] for Identification," the controller 110 may extract text "1588-0000," "[XX Telecom]," "Enter," "Authentication code," "[67625]," "for," and "Identification" from the message by basic morpheme analysis, identify at least one of "date information," "time information," "money amount information," "invoice number," "reservation number," "authentication code," and "sender" which have been predetermined as important information needed for the user, and thus extract important information, "[XX Telecom]" (sender) and "[67625]" (authentication code).

According to various embodiments, the controller 110 may determine a message type from the message in operation 407b.

For example, the controller 110 may analyze the text included in the message by a natural language analysis method for messages and determine the message type based on the result of the text analysis.

With reference to Table 2, message types will be described below.

Table 2 lists message types at level 1 and level 2 according to various embodiments.

TABLE 2

| Level 1 | | Level 2 |
|---|---|---|
| Finance | Bank | Deposit |
| | | Withdraw |
| | | Schedule |
| | | Others |
| | Loan | Interest |
| | | Others |
| | Settlement | Approve |
| | | Cancel |
| | | Point use |
| | | Discount |
| | | Fail |
| | | Monthly payment |
| | | Others |
| Delivery | | Request |
| | | Start |
| | | Status |
| | | Complete |
| | | Schedule |
| | | Fail |
| | | Others |
| Instant message | | Query |
| | | Greeting |
| Payment | | Approve |
| | | Cancel |
| | | Sold-out |
| | | Others |
| Reservation | | Complete |
| | | Cancel |
| | | Others |
| Advertisement | | Discount |
| | | Event |
| | | New product |
| | | Coupon |
| | | Others |
| Signature | | Authentication code |
| | | SIGN_IN |
| | | SIGN_OUT |
| | | Others |
| Communication | | Data use |
| | | Roaming |
| | | Payment report |
| | | Catch call |
| | | Others |
| Emergency | | Emergency notice |

As noted from Table 2, message types may be classified at two levels, level 1 and level 2.

For example, message types at level 1 may include finance (bank, loan, and settlement), delivery, instant message, payment, reservation, advertisement, signature, communication, and/or emergency.

For example, the message types may include finance-bank-deposit, finance-bank-withdraw, finance-bank-schedule, finance-bank-others, finance-loan-interest, finance-loan-others, finance-settlement-approve, finance-settlement-cancel, finance-settlement-point use, finance-settlement-discount, finance-settlement-fail, finance-settlement-monthly payment, finance-settlement-others, delivery-request, delivery-start, delivery-status, delivery-complete, delivery-schedule, delivery-fail, delivery-others, instant message-query, instant message-greeting, payment-approve, payment-cancel, payment-sold-out, payment-others, reservation-complete, reservation-cancel, reservation-others, advertisement-discount, advertisement-event, advertisement-new product, advertisement-coupon, advertisement-others, signature-authentication code, signature-SIGN_IN, signature-SIGN_OUT, signature-others, communication-data use, communication-roaming, communication-payment report, communication-catch call, communication-others, and emergency-emergency notice.

According to various embodiments, the controller 110 may convert the message to summary information based on the sender, important information, and/or message type in operation 409b.

For example, the controller 110 may convert the same message to different pieces of summary information based on different senders.

For example, the controller 110 may convert a first message to first summary information based on a first sender, and to second summary information based on a second sender. For example, the controller 110 may convert the message saying "1588-0000 [XX Telecom] Enter Authentication code [67625] for Identification" to summary information "Authentication code [67625] from [XX Telecom]" based on the sender [XX Telecom]. For example, the controller 110 may convert "010-XXXX-YYYY [Advertiser YY] Enter Authentication code [67625] for Identification" to summary information "[YY] Ad Message" based on the sender "Advertiser YY."

For example, the controller 110 may convert a message to different summary information according to different important information.

For example, the controller 110 may convert a first message including first important information to first summary information, and a second message including second important information to second summary information. For example, the controller 110 may convert a message saying "1588-0000 [sender in msg] Enter Authentication code [numbers] for Identification" into "Authentication code [numbers] from [sender in msg]" based on important information "[sender in msg]" and "[numbers]." For example, the controller 110 may convert the message saying "1588-0000 [sender in msg] Enter Authentication code [numbers] for Identification" to "Authentication code [numbers]" based on important information "[numbers]."

For example, the controller 110 may convert a message to different summary information based on different message types.

For example, the controller 110 may convert a first message to first summary information based on a first message type, and convert the first message to second summary information based on a second message type. For example, the controller 110 may convert a message saying "1588-XXXX [AA] Enter Authentication code [608280] for Certificate Reissue . . . " to summary information "Authentication code is [608280]" based on the message type "authentication code." For example, the controller 110 may convert the message saying "1588-XXXX [AA] Enter Authentication code [608280] for Certificate Reissue . . . " to summary information "Ad Message" based on the message type "advertisement."

According to various embodiments, the controller 110 may obtain user status information in operation 411b.

The user status information may be obtained in the same manner as in operation 403 of FIG. 4A.

According to various embodiments, the controller 110 may obtain display status information related to a status in which a message is displayed, in operation 413b.

The display status information may be obtained in the same manner as in operation 403 of FIG. 4A.

According to various embodiments, the controller 110 may determine a notification scheme for notifying a user of the message based on the sender, the message type, the user status information, and/or the display status information (status information) in operation 415b.

The notification scheme may be determined in the same manner as in operation 405a of FIG. 4A.

According to various embodiments, the controller 110 may convert the summary information to a summary message according to the determined notification scheme in operation 417b.

For example, after determining the notification scheme, the controller 110 may convert the summary information to a summary message in order to output the summary information in the determined notification scheme. For example, if determining "voice" as the notification scheme of the message, the controller 110 may generate a summary message of colloquial style to output the summary information in the determined notification scheme, "voice." For example, if determining "brief" as the notification scheme of the message, the controller 110 may generate a summary message including only important information to output the summary information in the determined notification scheme, "brief."

According to various embodiments, the controller 110 may output the summary message in the notification scheme in operation 419b.

The summary message may be output in the same manner as in operation 407a of FIG. 4A.

Figure 5A:
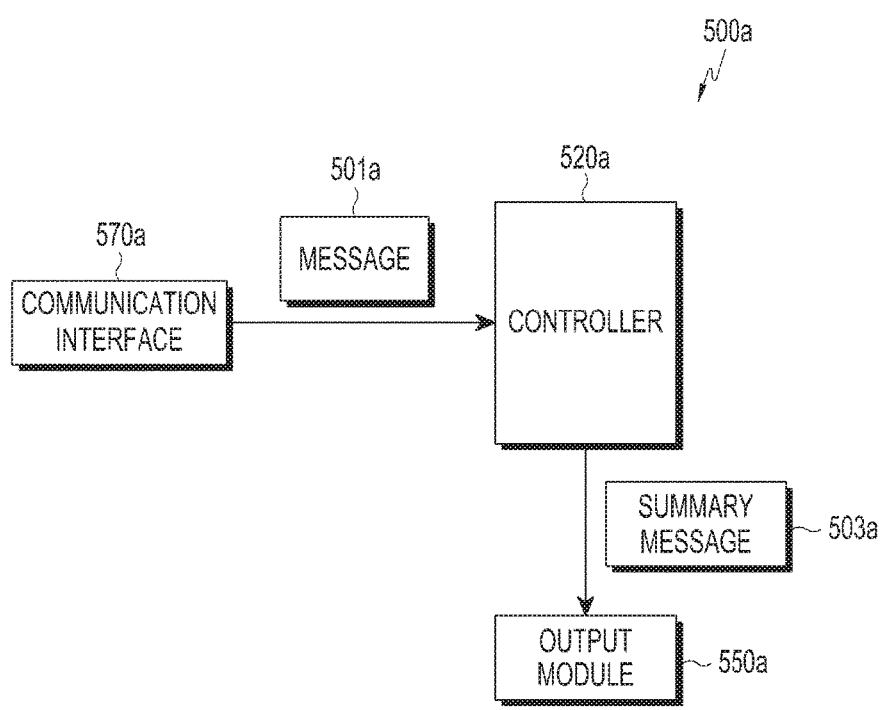
FIG. 5A is a block diagram of an electronic device according to an embodiment of the present disclosure.

FIG. 5A is a block diagram of an electronic device according to an embodiment of the present disclosure.

Referring to FIG. 5A, according to various embodiments, an electronic device 500a may include a communication interface 570a, a controller 520a, and/or an output module 550a.

According to various embodiments, the communication interface 570a may receive a message 501a from the outside.

According to various embodiments, the controller 520a may control an operation of the communication interface 570a, the output module 550a, and/or at least one component of the electronic device 500a.

According to various embodiments, the controller 520a may obtain status information about the electronic device 500a, determine a notification scheme for outputting the message 501a, and convert the message 501a to a summary message 503a according to the determined notification scheme.

According to various embodiments, the output module 550a may output the summary message 503a.

Figure 5B:
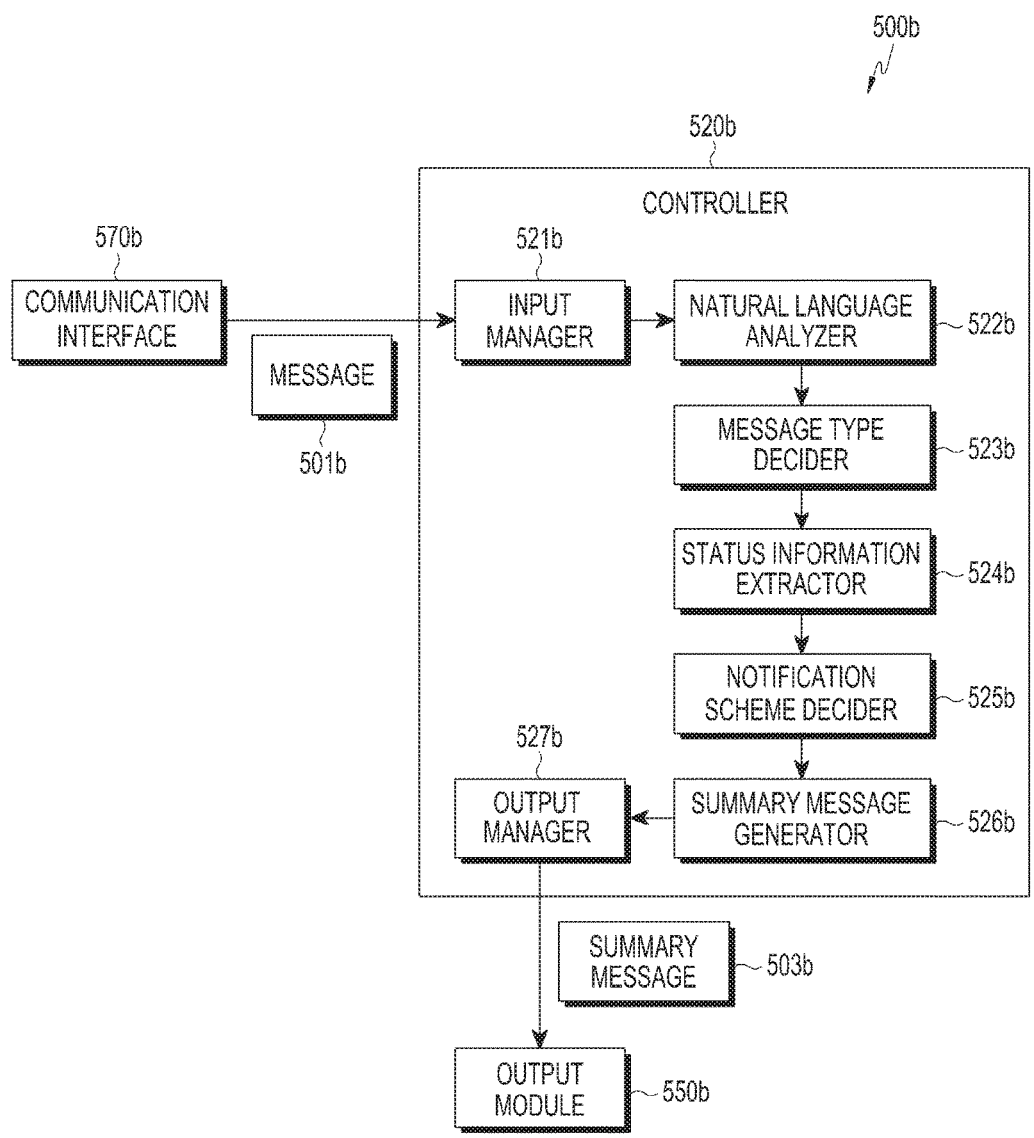
FIG. 5B is a block diagram of an electronic device according to an embodiment of the present disclosure.

FIG. 5B is a block diagram of an electronic device according to an embodiment of the present disclosure.

Referring to FIG. 5B, according to various embodiments, an electronic device 500b may include a communication interface 570b, a controller 520b, and/or an output module 550b.

According to various embodiments, the communication interface 570b may be configured to execute the functionality of the communication interface (for example, the sub-communication module 130) of FIG. 1. For example, the communication interface 570b may receive a message 501b from the outside and transmit the message 501b to the controller 520b.

According to various embodiments, the controller 520b may be configured to execute the functionality of the controller 110 of FIG. 1. For example, the controller 520b may include an input manager 521b, a natural language analyzer 522b, a message type decider 523b, a status information extractor 524b, a notification scheme decider 525b, a summary message generator 526b, and/or an output manager 527b.

According to various embodiments, the input manager 521b may receive the message 501b from the communication interface 570b.

According to various embodiments, the natural language analyzer 522b may receive the message 501b from the input manager 521b. According to various embodiments, the natural language analyzer 522b may obtain information about a sender of the message 501b and/or important information of the message 501b by analyzing text included in the message 501b according to a natural language analysis method.

According to various embodiments, the message type decider 523b may determine the type of the message 501b according to the natural language analysis method for the text included in the message 501b.

According to various embodiments, the message type decider 523b may analyze the text of the message 501b at level 1 and level 2 in the natural language analysis method.

For example, the message type decider 523b may classify the message 501b as a finance (bank, loan, or settlement)-related message at level 1.

For example, the message type decider 523b may classify the message 501b as a message related to deposit, withdraw, schedule, others, interest, or others at level 2, for a more elaborate classification of the bank-related message.

For example, the message type decider 523b may classify the message 501b as a message related to interest or others at level 2, for a more elaborate classification of the loan-related message.

For example, the message type decider 523b may classify the message 501b as a message related to approve, cancel, point use, discount, fail, monthly payment, or others at level 2, for a more elaborate classification of the settlement-related message.

For example, the message type decider 523b may classify the message 501b as a delivery-related message at level 1 of message type classification.

For example, the message type decider 523b may classify the message 501b as a message related to request, start, status, complete, schedule, fail, or others at level 2, for a more elaborate classification of the delivery-related message.

For example, the message type decider 523b may classify the message 501b as an instant message at level 1 of message type classification.

For example, the message type decider 523b may classify the message 501b as a message related to query or greeting at level 2, for a more elaborate classification of the instant message.

For example, the message type decider 523b may classify the message 501b as a payment-related message at level 1 of message type classification.

For example, the message type decider 523b may classify the message 501b as a message related to approve, cancel, sold-out, or others at level 2, for a more elaborate classification of the payment-related message.

For example, the message type decider 523b may classify the message 501b as a reservation-related message at level 1 of message type classification.

For example, the message type decider 523b may classify the message 501b as a message related to complete, cancel, or others at level 2, for a more elaborate classification of the reservation-related message.

For example, the message type decider 523b may classify the message 501b as an advertisement-related message at level 1 of message type classification.

For example, the message type decider 523b may classify the message 501b as a message related to discount, event, new product, coupon, or others at level 2, for a more elaborate classification of the advertisement-related message.

For example, the message type decider 523b may classify the message 501b as a signature-related message at level 1 of message type classification.

For example, the message type decider 523b may classify the message 501b as a message related to authentication code, SIGN_IN, SIGN_OUT, or others at level 2, for a more elaborate classification of the signature-related message.

For example, the message type decider 523b may classify the message 501b as a communication message at level 1 of message type classification.

For example, the message type decider 523b may classify the message 501b as a message related to data use, roaming, payment report, catch call, or others at level 2, for a more elaborate classification of the communication message.

For example, the message type decider 523b may classify the message 501b as an emergency message at level 1 of message type classification.

For example, the message type decider 523b may classify the message 501b as a message related to emergency notice at level 2, for a more elaborate classification of the emergency message.

According to various embodiments, the controller 520b may convert the message 501b to summary information based on the sender, important information, and/or message type of the message 501b.

According to various embodiments, the status information extractor 524b may obtain user status information and/or display status information from at least one external module (for example, an I/O module (for example, the I/O module 160), or a touch screen (the touch screen 190)), after the summary information is generated for the message.

According to various embodiments, the notification scheme decider 525b may determine a notification scheme for outputting the message 501b based on the user status information, the display status information, the sender, and/ or the message type.

According to various embodiments, the summary message generator 526b may convert the summary information to a summary message 503b to output the message 501b in the determined notification scheme.

According to various embodiments, the controller 520b may output the generated summary message 503b to the output module 550b (for example, the I/O module 160, the touch screen 190, the communication module (for example, the mobile communication module 120, the sub-communication module 130, the WLAN module 131, or the short-range communication module 132)) through the output manager 527b.

Figure 6:
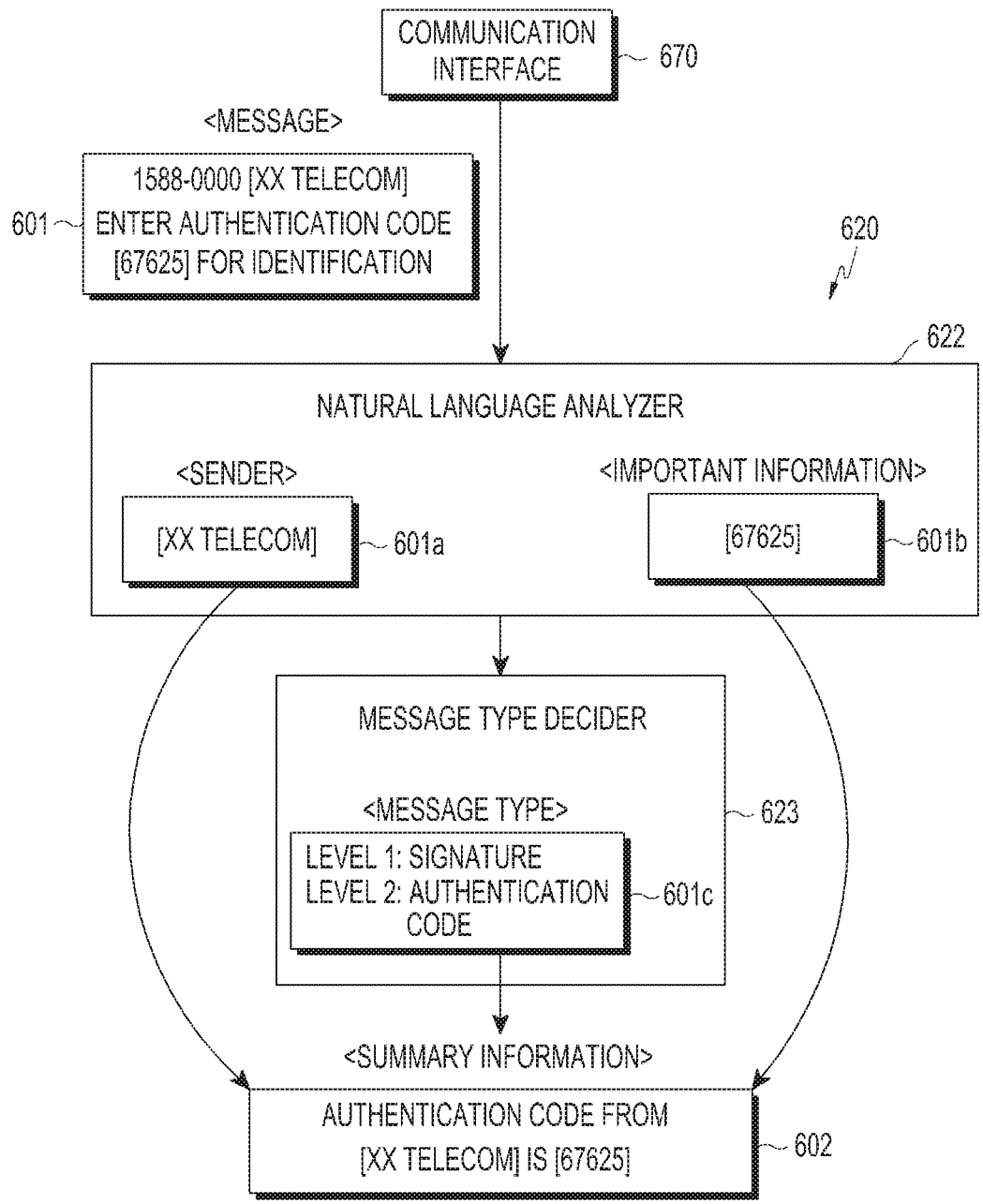
FIG. 6 is a view illustrating a method for generating summary information by extracting important information according to an embodiment of the present disclosure.

FIG. 6 is a view illustrating a method for generating summary information by extracting important information according to an embodiment of the present disclosure.

Referring to FIG. 6, according to various embodiments, an input manager 620 (for example, the input manager 521) of a controller (for example, the controller 520a or 520b) may receive a message 601 including text "1588-0000 [XX Telecom] Enter Authentication code [67625] for Identification" from a communication interface 670 and transmit the message 601 to a natural language analyzer 622.

According to various embodiments, the natural language analyzer 622 may determine a sender 601a to be "[XX Telecom]" by applying a natural language analysis method to the text included in the message 601, "1588-0000 [XX Telecom] Enter Authentication code [67625] for Identification." According to various embodiments, the natural language analyzer 622 may obtain "[67625]" as important information 601b by applying the natural language analysis method to the text included in the message 601, "1588-0000 [XX Telecom] Enter Authentication code [67625] for Identification."

According to various embodiments, the natural language analyzer 622 may transmit the received message 601 including the text "1588-0000 [XX Telecom] Enter Authentication code [67625] for Identification" to the message type decider 623.

According to various embodiments, the message type decider 623 may obtain "LEVEL 1: Signature" and "LEVEL 2: Authentication Code" as a message type 601c by applying the natural language analysis method to the received message 601 including the text "1588-0000 [XX Telecom] Enter Authentication code [67625] for Identification."

According to various embodiments, the controller 520a or 520b may convert the message 601 including the text "1588-0000 [XX Telecom] Enter Authentication code [67625] for Identification" to summary information 602 "Authentication code from [XX Telecom] is [67625]" based on the sender 601a "[XX Telecom]," the important information 601b "[67625]," and the message type 601c, "LEVEL 1: Signature" and "LEVEL 2: Authentication Code."

Figure 7A:
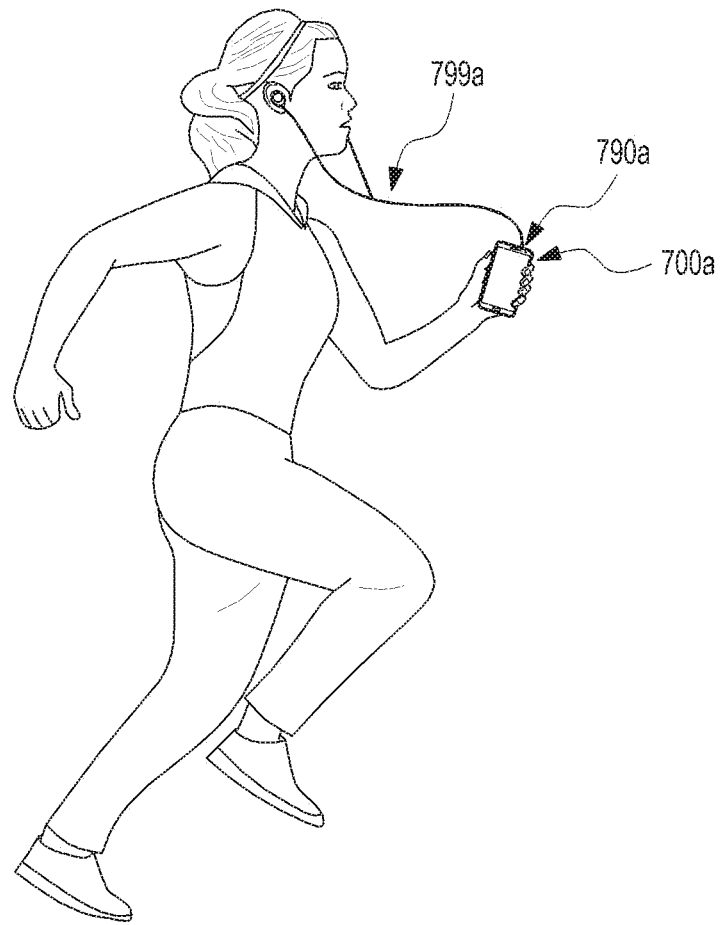
FIG. 7A is a view illustrating an operation for obtaining user status information according to an embodiment of the present disclosure.

FIG. 7A is a view illustrating an operation for obtaining user status information according to an embodiment of the present disclosure.

Referring to FIG. 7A, according to various embodiments, as an earphone 799a is connected to an earphone connector jack 790a, an electronic device 700a may receive earphone status information indicating "the earphone is connected" from the earphone connector jack 790a.

According to various embodiments, the electronic device 700a may obtain user status information indicating that a user of the electronic device 700a is "working out" based on the earphone status information indicating "the earphone is connected."

Figure 7B:
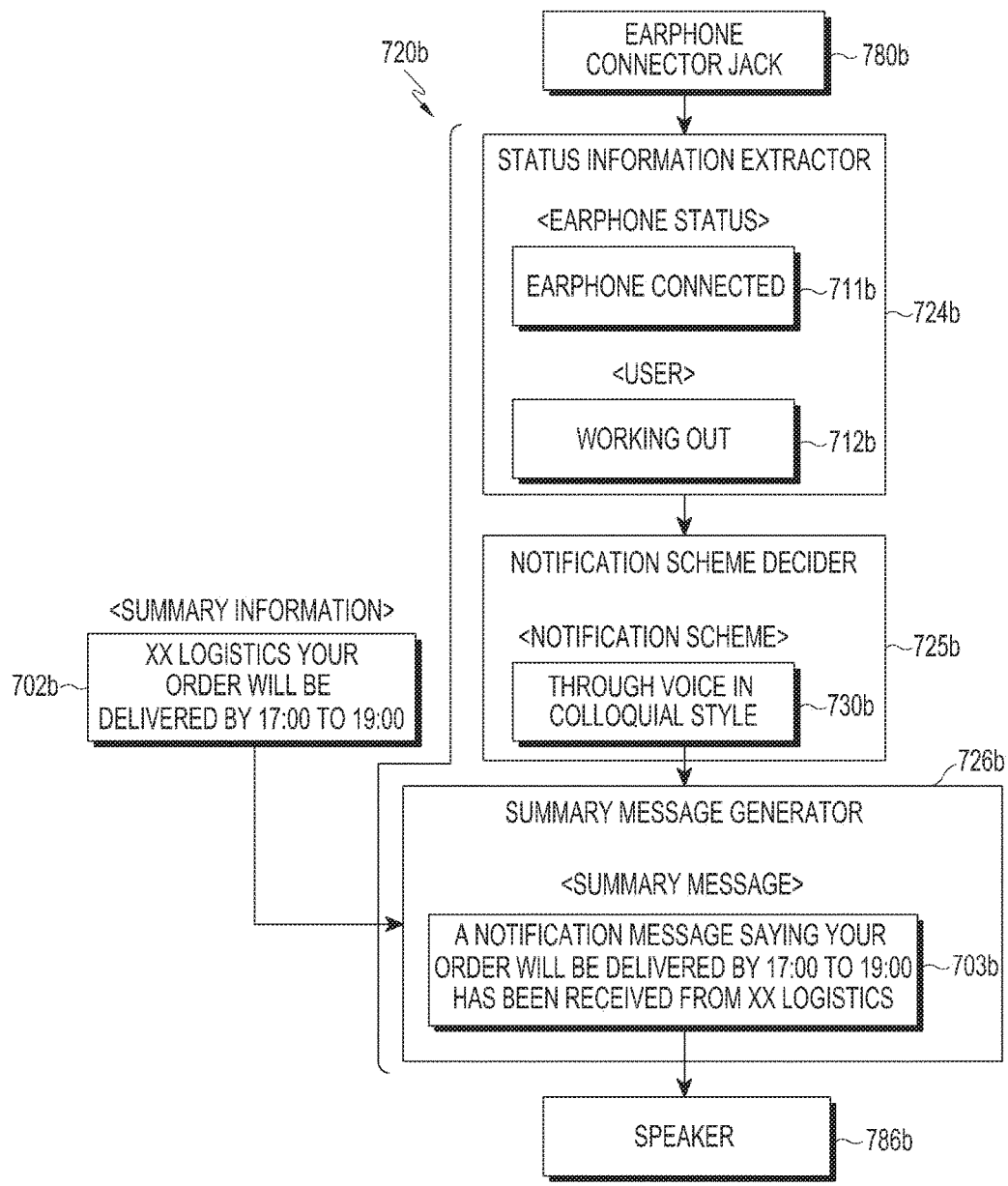
FIG. 7B is a view illustrating a method for generating a summary message by determining a notification scheme according to an embodiment of the present disclosure.

FIG. 7B is a view illustrating a method for generating a summary message by determining a notification scheme according to an embodiment of the present disclosure.

Referring to FIG. 7B, according to various embodiments, as an earphone is connected to an earphone connector jack 780b, a status information extractor 724b of a controller 720b in an electronic device (for example, the electronic device 700a) may receive earphone status information 711b indicating that "the earphone is connected" from the earphone connector jack 780b.

According to various embodiments, the status information extractor 724b may obtain user status information 712b indicating that the user of the electronic device 700a is "working out" based on the received earphone status information 711b indicating that "the earphone is connected."

According to various embodiments, the status information extractor 724b may obtain user status information 712b indicating "working out" and transmit the user status information 712b to a notification scheme decider 725b.

For example, while not shown in FIG. 7B, a memory (for example, the storage 175) of the electronic device 700a may store a program related to operation modes of the electronic device 700a (for example, a navigation application). For example, the status information extractor 724b may determine that the user has selected "drive mode" in the operation mode program and thus the operation mode of the electronic device 700a has switched to the "drive mode."

For example, the status information extractor 724b may determine that the user has selected "sleep mode" in the operation mode program and thus the operation mode of the electronic device 700a has switched to the "sleep mode."

According to various embodiments, the notification scheme decider 725b may determine "through voice in colloquial style" as a notification scheme 730b based on the received user status information 712b indicating "working out."

According to various embodiments, a summary message generator 726b may be notified of the notification scheme 730b, "through voice in colloquial style" from the notification scheme decider 725b, and receive summary information 702b "XX Logistics Your Order will be Delivered by 17:00 to 19:00."

According to various embodiments, the summary message generator 726b may convert the summary information 702b "XX Logistics Your Order will be Delivered by 17:00 to 19:00" to a summary message 703b saying "A Notification Message Saying Your Order Will Be Delivered By 17:00 To 19:00 Has Been Received From XX Logistics," based on the notification scheme 730b, "through voice in colloquial style."

According to various embodiments, a controller (for example, the controller 520a or 520b) may output the generated summary message 703b saying "A Notification Message Saying Your Order Will Be Delivered By 17:00 To 19:00 Has Been Received From XX Logistics" through a speaker 786b by voice.

Figure 8A:
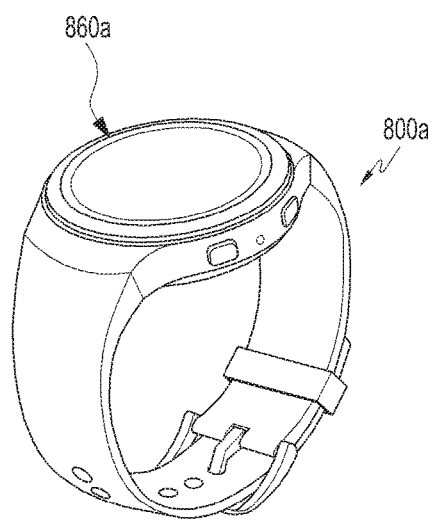
FIG. 8A is a view illustrating an operation for obtaining display status information according to an embodiment of the present disclosure.

FIG. 8A is a view illustrating an operation for obtaining display status information according to an embodiment of the present disclosure.

Referring to FIG. 8A, according to various embodiments, an electronic device 800a may obtain display shape information indicating "circular display" using a display 860a. For example, the ROM 112 included in a controller (for example, the controller 110) may have display shape information. For example, the ROM 112 may have display size information and/or display shape information in relation to the electronic device 800a, and the controller 110 of the electronic device 800a may obtain the display size information and/or the display shape information from the ROM 110.

According to various embodiments, the electronic device 800a may obtain display status information indicating "circular display" based on the display shape information indicating "circular display."

Figure 8B:
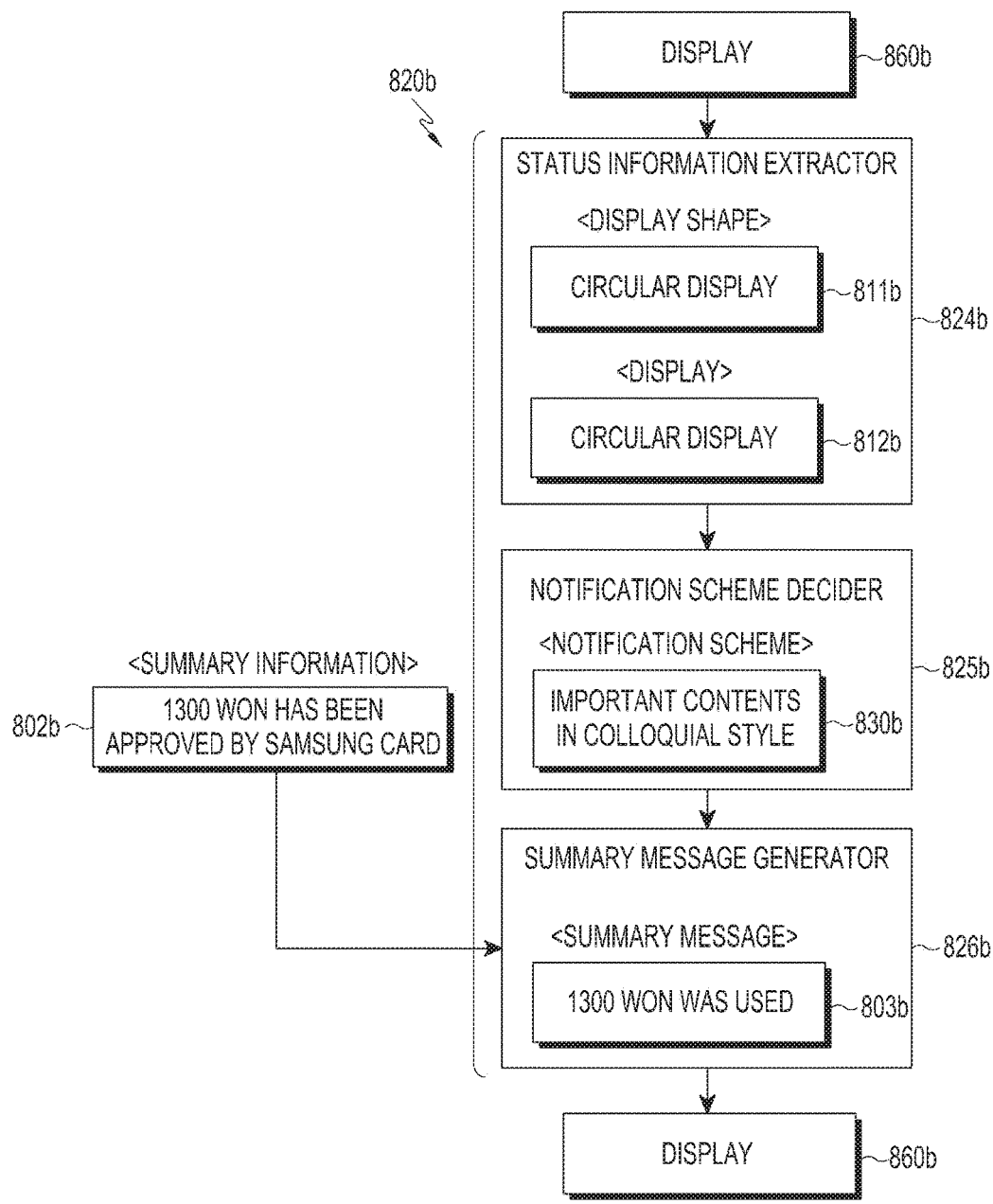
FIG. 8B is a view illustrating a method for generating a summary message by determining a notification scheme according to an embodiment of the present disclosure.

FIG. 8B is a view illustrating a method for generating a summary message by determining a notification scheme according to an embodiment of the present disclosure.

Referring to FIG. 8B, according to various embodiments, a status information extractor 824b included in a controller 820b of an electronic device (for example, the electronic device 800a) may obtain display shape information 811b indicating "circular display" using a display 860b.

According to various embodiments, the status information extractor 824b may obtain display status information 812b indicating "circular display" based on the display shape information 811b indicating "circular display."

According to various embodiments, a notification scheme decider 825b may determine "important contents in colloquial style" as a notification scheme 830b based on the display status information 812b indicating "circular display" obtained by the status information extractor 824b.

According to various embodiments, a summary message generator 826b may convert summary information 802b "1300 won Has Been Approved by Samsung Card" to a summary message 803b "1300 won Was Used" in the notification scheme 830b "important contents in colloquial style" determined by the notification scheme decider 825b.

According to various embodiments, the controller 820b may output only important contents of the message by displaying the summary message 803b "1300 won was used" on the display 860b.

Figure 9A:
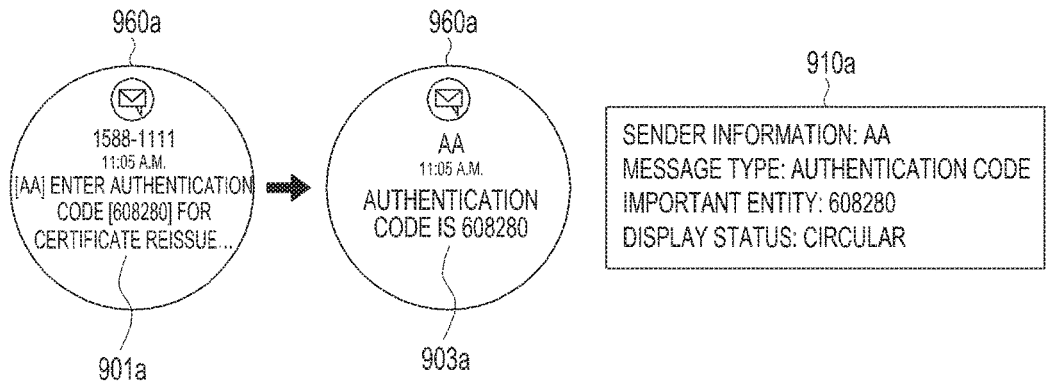
FIGS. 9A, 9B, and 9C are views illustrating a method for outputting a summary message according to display status information according to an embodiment of the present disclosure.
Figure 9B:
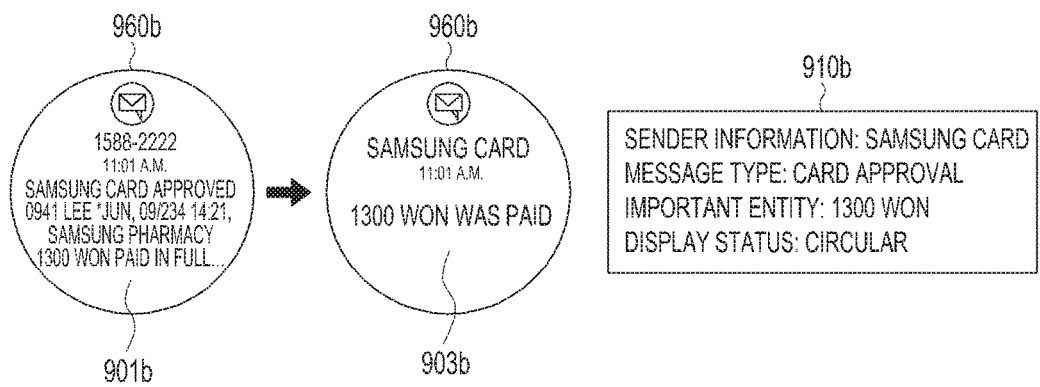
Figure 9C:
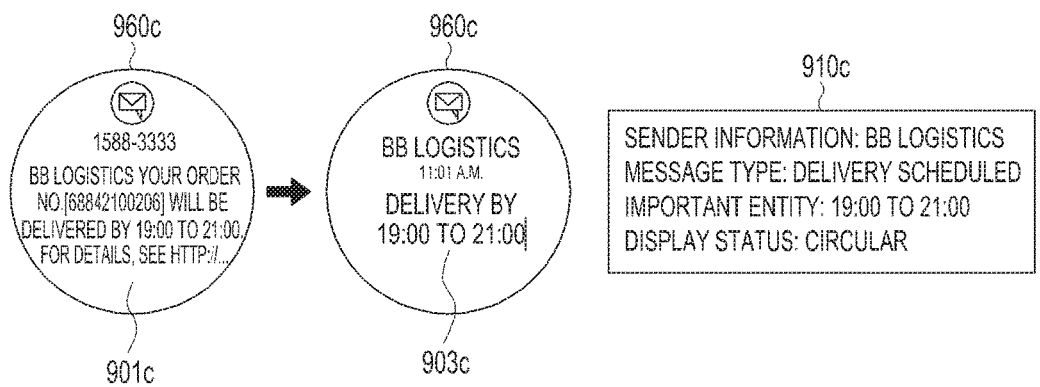

FIGS. 9A, 9B, and 9C are views illustrating a method for outputting a summary message based on display status information according to an embodiment of the present disclosure.

Referring to FIG. 9A, according to various embodiments, a controller (for example, the controller 520a or 520b) may display a message 901a including text "1588-1111 [AA] Enter Authentication code [608280] for Certificate Reissue . . . " on a display 960a.

According to various embodiments, the controller 520a or 520b may obtain "AA" as sender information, "Authentication code" as a message type, "608280" as important information (important entity), and/or "circular" as display status information, as indicated by reference numeral 910a, from the message 901a including the text "1588-1111 [AA] Enter Authentication code [608280] for Certificate Reissue . . . ."

According to various embodiments, the controller 520a or 520b may determine "only important contents in brief" as a notification scheme, based on the sender information "AA" the message type "Authentication code," the important information (important entity) "608280," and/or the display status information "circular."

According to various embodiments, the controller 520a or 520b may convert the message 901a including the text "1588-1111 [AA] Enter Authentication code [608280] for Certificate Reissue . . . " to a summary message 903a "[AA] Authentication code is 608280" based on the determined notification scheme "only important contents in brief."

According to various embodiments, the controller 520a or 520b may display the summary message 903a "[AA] Authentication code is 608280" on the display 960a.

Referring to FIG. 9B, according to various embodiments, the controller 520a or 520b may receive and display a message 901b including text "1588-2222 Samsung Card Approved 0941 LEE *Jun, 09/14 14:21, Samsung Pharmacy 1300 won Paid in Full . . . " on a display 960b.

According to various embodiments, the controller 520a or 520b may obtain "Samsung Card" as sender information, "card approval" as a message type, "1300 won" as important information (important entity), and/or "circular" as display status information, as indicated by reference numeral 910b from the message 901b including the text "1588-2222 Samsung Card Approved 0941 LEE *Jun, 09/14 14:21, Samsung Pharmacy 1300 won Paid in Full . . . ."

According to various embodiments, the controller 520a or 520b may determine "only important contents in brief" as a notification scheme, based on the sender information "Samsung Card," the message type "card approval," the important information (important entity) "1300 won," and/or the display status information "circular" from the message 901b including the text "1588-2222 Samsung Card Approved 0941 LEE *Jun, 09/14 14:21, Samsung Pharmacy 1300 won Paid in Full . . . ."

According to various embodiments, the controller 520a or 520b may convert the message 901b including the text "1588-2222 Samsung Card Approved 0941 LEE *Jun, 09/14 14:21, Samsung Pharmacy 1300 won Paid in Full . . . " to a summary message 903b "[Samsung Card] 1300 won Was Paid" based on the determined notification scheme "only important contents in brief."

According to various embodiments, the controller 520a or 520b may display the summary message 903b "[Samsung Card] 1300 won Was Paid" on the display 960b.

Referring to FIG. 9C, according to various embodiments, the controller 520a or 520b may receive and display a message 901c including text "1588-3333 BB Logistics Your order No. [68842100206] will be Delivered by 19:00 to 21:00. For Details, See http://appdown.com" on a display 960c.

According to various embodiments, the controller 520a or 520b may obtain "BB Logistics" as sender information, "delivery scheduled" as a message type, "19:00 to 21:00" as important information (important entity), and/or "circular" as display status information, as indicated by reference numeral 910c, from the message 901c including the text "1588-3333 BB Logistics Your order No. [68842100206] will be delivered by 19:00 to 21:00. For Details, See http://appdown.com."

According to various embodiments, the controller 520a or 520b may determine "only important contents in brief" as a notification scheme, based on the sender information "BB Logistics," the message type "delivery scheduled," the important information (important entity) "19:00 to 21:00," and/or the display status information "circular" from the message 901c including the text "1588-3333 BB Logistics Your order No. [68842100206] will be delivered by 19:00 to 21:00. For Details, See http://appdown.com."

According to various embodiments, the controller 520a or 520b may convert the message 901c including the text "1588-3333 BB Logistics Your order No. [68842100206] will be delivered by 19:00 to 21:00. For Details, See http://appdown.com" to a summary message 903c "[BB Logistics] Delivery by 19:00 to 21:00" based on the determined notification scheme "only important contents in brief."

According to various embodiments, the controller 520a or 520b may display the summary message 903c "[BB Logistics] Delivery by 19:00 to 21:00" on the display 960c.

FIGS. 10A, 10B, 10C, and 10D are views illustrating a method for determining a notification scheme based on display status information according to an embodiment of the present disclosure.

Referring to FIG. 10A, according to various embodiments, to display a received message on an electronic device 1000a, a controller (for example, the controller 520a or 520b) may determine a notification scheme that enables display of "Samsung Card" as a sender 1004a and a summary message 1003a saying "1300 won Was Paid in Samsung Pharmacy."

Referring to FIG. 10B, according to various embodiments, a controller (for example, the controller 520a or 520b) of an electronic device 1000b may determine a notification scheme that enables display of a card icon 1004b representing "Samsung Card" as a sender and a summary message saying "1300 won Was Paid in Samsung Pharmacy."

Referring to FIG. 10C, according to various embodiments, a controller (for example, the controller 520a or 520b) may determine a notification scheme that enables display of a summary message 1003c in colloquial style on an electronic device 1000c.

Referring to FIG. 10D, according to various embodiments, a controller (for example, the controller 520a or 520b) may determine a notification scheme that enables display of a sender icon 1004d representing a message sender along with a summary message on an electronic device 1000d.

Figure 11:
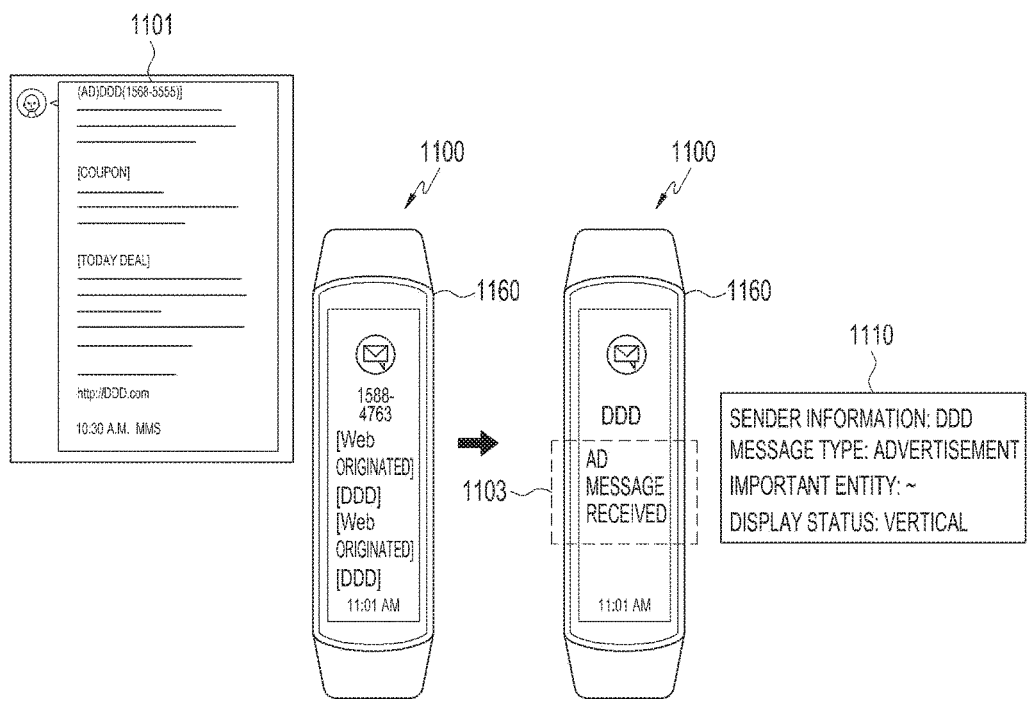
FIG. 11 is a view illustrating a method for determining a notification scheme according to display status information according to an embodiment of the present disclosure.

FIG. 11 is a view illustrating a method for determining a notification scheme based on display status information according to an embodiment of the present disclosure.

Referring to FIG. 11, according to various embodiments, a controller (for example, the controller 520a or 520b) of an electronic device 1100 may obtain display status information indicating that a display 1160 is "vertically" oriented, and obtain "DDD" as a sender and "advertisement" as a message type, as indicated by reference numeral 1110, from a received message 1101.

According to various embodiments, the controller 520a or 520b may determine "only message reception or not in brief" as a notification scheme based on the display status information indicating "vertical orientation" of the display 1160, and the sender "DDD" and the message type "advertisement" obtained from the received message 1101.

According to various embodiments, the controller 520a or 520b may convert the received message 1101 to a summary message 1103 saying "[DDD] Ad message Received" based on the determined notification scheme "only message reception or not in brief" and display the summary message 1103 on the vertically oriented display 1160.

Figure 12:
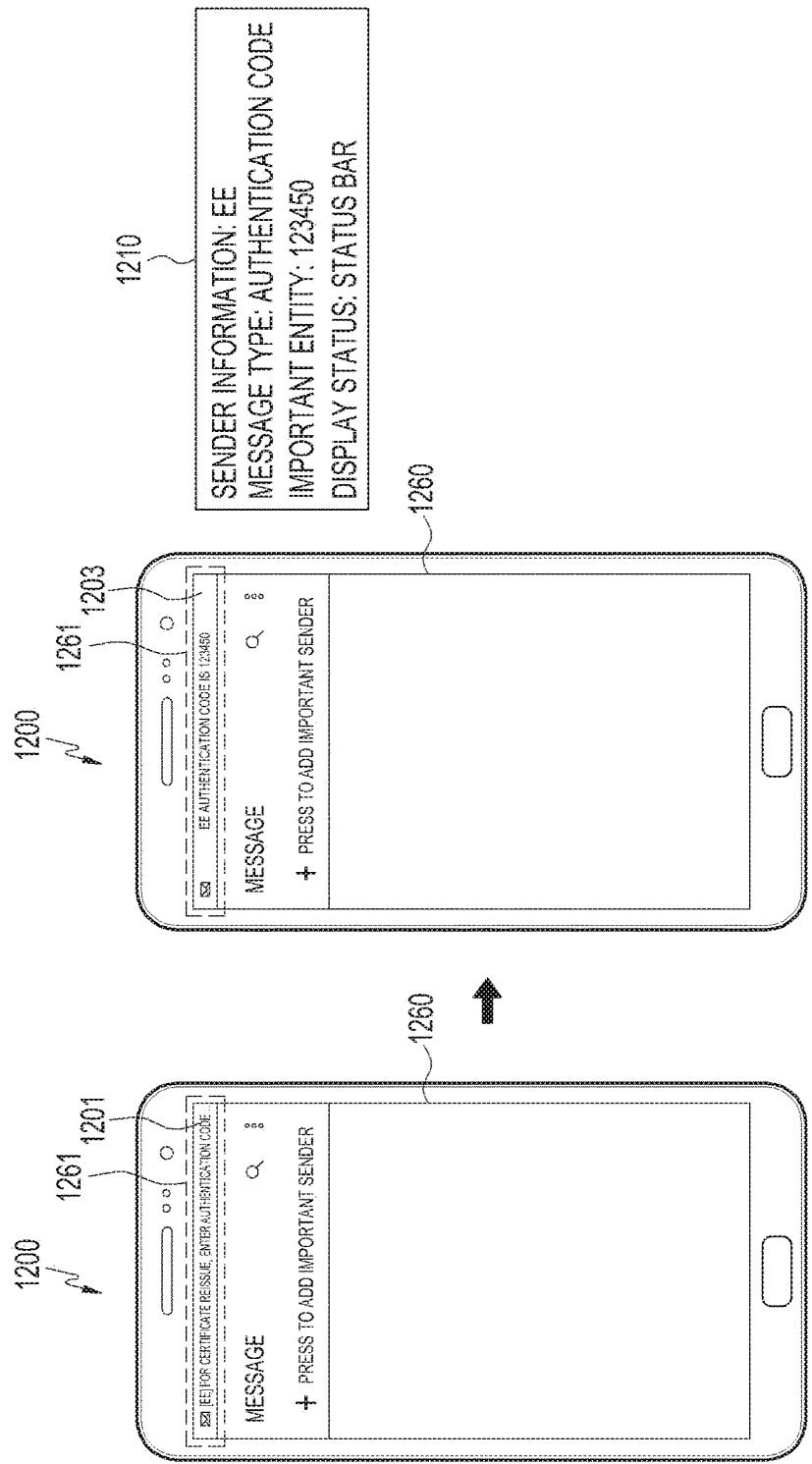
FIG. 12 is a view illustrating a method for determining a notification scheme according to display status information according to an embodiment of the present disclosure.

FIG. 12 is a view illustrating a method for determining a notification scheme based on display status information according to an embodiment of the present disclosure.

Referring to FIG. 12, according to various embodiments, a controller (for example, the controller 520a or 520b) of an electronic device 1200 may display a screen of a first application (for example, a message application) on a display 1260, as illustrated in the left drawing of FIG. 12.

According to various embodiments, the controller 520a or 520b may display information related to a specific event (for example, message reception) in a status bar 1261 at a top part of a display area of the display 1260.

According to various embodiments, the controller 520a or 520b may display a received message including text "[EE] For Certificate Reissue, Enter Authentication code . . . " received through a communication interface (for example, the communication interface 570a) in the status bar 1261. For example, the controller 520a or 520b may display only partial text of a second length displayable in the status bar 1261, "[EE] For Certificate Reissue, Enter Authentication code" out of the text of a first length included in the message, "[EE] For Certificate Reissue, Enter Authentication code . . . ." In this case, only when a user drags the status bar 1261 and touch an item corresponding to text in a notification window resulting from the dragging, the user may view the full text or important information of the full text.

According to various embodiments, the controller 520a or 520b may obtain "status bar" as display status information based on the horizontally extended shape of the status bar 1261 in the display area of the display 1260, and obtain "EE" as a sender, "Authentication code" as a message type, and "123450" as important information (1210), from the message including "[EE] For Certificate Reissue, Enter Authentication code . . . " as illustrated in the left drawing.

According to various embodiments, the controller 520a or 520b may determine "only important contents in brief" as a notification scheme for the message 1201 including the text "[EE] For Certificate Reissue, Enter Authentication code . . . " using the display status "status bar," "EE" as the sender, "Authentication code" as the message type, and "123450" as the important information, as indicated by reference numeral 1210.

According to various embodiments, the controller 520*a* or 520*b* may convert the message 1201 to a summary message 1203 saying "EE Authentication code is 123450" according to the notification scheme "only important contents in brief," and display the summary message 1203 in the horizontally extended status bar 1261 of the display 1260.

Figures 13A, 13B:
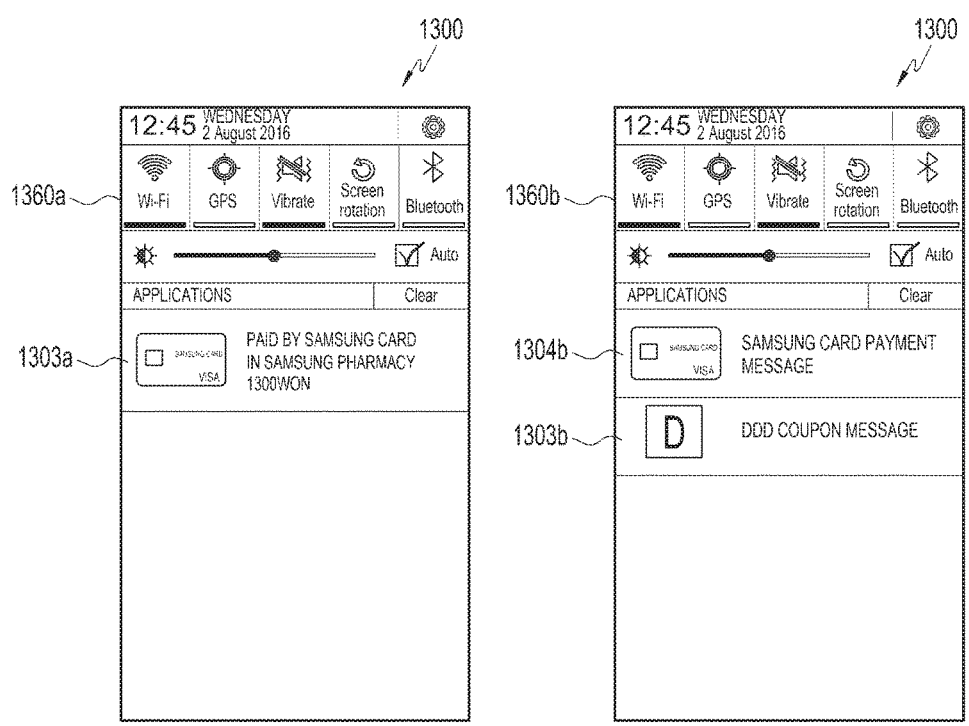
FIGS. 13A and 13B are views illustrating a method for determining a notification scheme according to display status information according to an embodiment of the present disclosure.

FIGS. 13A and 13B are views illustrating a method for determining a notification scheme based on display status information according to various embodiments of the present disclosure.

Referring to FIGS. 13A and 13B, according to various embodiments, a controller (for example, the controller 520*a* or 520*b*) of an electronic device 1300 may display a notification window on a display 1360*a* and 1360*b*.

According to various embodiments, the controller 520*a* or 520*b* may display information related to a specific event (for example, message reception) in a notification window.

Referring to FIG. 13A, according to various embodiments, the controller 520*a* or 520*b* may obtain display status information indicating that an event display area is a "notification window" in the display 1360*a*.

According to various embodiments, upon generation of an event (reception of a message indicating payment by Samsung Card), the controller 520*a* or 520*b* may generate a summary message 1303*a* saying "Paid by Samsung Card/in Samsung Pharmacy/1300 won" in relation to the event (the reception of the message indicating payment by Samsung Card) and display the summary message 1303*a* in the notification window of the display 1360*a*.

Referring to FIG. 13B, according to various embodiments, the controller 520*a* or 520*b* may obtain display status information indicating that an event display area is a "notification window" in the display 1360*b*.

According to various embodiments, upon generation of two or more events (event 1: reception of a message indicating payment by Samsung Card and event 2: reception of a DDD coupon message), the controller 520*a* or 520*b* may generate a first summary message 1304*a* saying "Paid by Samsung Card/in Samsung Pharmacy/1300 won" in relation to event 1 (the reception of the message indicating payment by Samsung Card) and a second summary message 1303*b* saying "DDD Coupon Message" in relation to event 2 (reception of a DDD coupon message), and display the first and second summary messages 1304*a* and 1304*b* in the notification window of the display 1360*b*.

Figure 14:
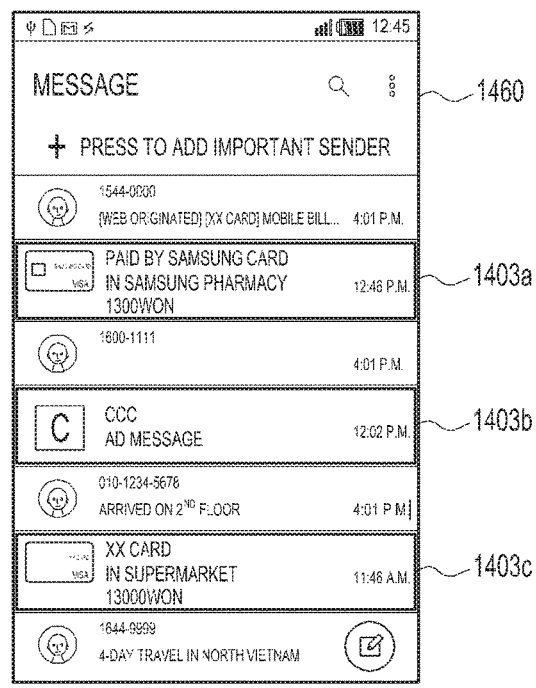
FIG. 14 is a view illustrating a method for determining a notification scheme according to display status information according to an embodiment of the present disclosure.

FIG. 14 is a view illustrating a method for determining a notification scheme based on display status information according to an embodiment of the present disclosure.

Referring to FIG. 14, according to various embodiments, upon execution of a message application, a controller (for example, the controller 520*a* or 520*b*) may display an execution screen of the message application on a display 1460.

For example, as illustrated in FIG. 14, the controller 520*a* or 520*b* may display a message list including a part of at least one message in an execution screen of a message application. For example, the controller 520*a* or 520*b* may display a message list including only partial text of a specific length displayable in the execution screen of the message application, out of text included in each message. For example, as illustrated in FIG. 14, the controller 520*a* or 520*b* may display a specific message item including only partial text of a specific length displayable in the execution screen of the message application, "1544-0000 [Web Originated] [XX Card]: Mobile Bill" out of text included in a specific message, "1544-0000 [Web Originated] [XX Card]: a Mobile Bill Is Received." In this case, to view the full text "1544-0000 [Web Originated] [XX Card]: a Mobile Bill Is Received," the user should inconveniently touch the specific message item.

In contrast, according to various embodiments, the controller 520*a* or 520*b* may convert a predetermined message from which a sender, a message type, or important information may be extracted to a summary message, among at least one message displayed in the execution screen of the message application, and display the summary message in the execution screen of the message application.

For example, it is assumed that messages corresponding to message items "1544-0000/[Web Originated] [XX Card] Mobile Bill . . . ," "1600-1111/Card Delivery, To Correct Person Only," "010-1234-5678/Arrived on the Second Floor," and "1644-9999/4-Day Travel in North Vietnam" are not predetermined messages from which a sender, a message type, or important information may be extracted, in FIG. 14.

For example, it is assumed that messages corresponding to message items "Paid by Samsung Card/in Samsung Pharmacy/1300 won," "CCC Ad Message," and "Paid by XX Card/in Supermarket/13000 won" are predetermined messages from which a sender, a message type, or important information may be extracted, in FIG. 14.

According to various embodiments, the controller 520*a* or 520*b* may convert a first message saying "[Samsung Card] 1300 won was paid in Samsung Pharmacy" to a first summary message 1403*a* saying "Paid by Samsung Card/in Samsung Pharmacy/1300 won" according to display status information indicating "message application screen" and display the first summary message 1403*a*, instead of displaying a message item including a part of the text "[Samsung Card] 1300 won was Paid in Samsung Pharmacy" in the message application screen displayed on the display 1460.

According to various embodiments, the controller 520*a* or 520*b* may convert a second message saying "[CCC] A New Product item is Now for Sale" to a second summary message 1403*b* saying "CCC Ad message" according to the display status information indicating "message application screen" and display the second summary message 1403*b*, instead of displaying a message item including a part of the text "[CCC] A New Product item is Now for Sale" in the message application screen displayed on the display 1460.

According to various embodiments, the controller 520*a* or 520*b* may convert a third message saying "[XX Card] 13000 won was Paid in the Supermarket" to a third summary message 1403*c* saying "Paid by XX Card/in Supermarket/ 13000 won" according to the display status information indicating "message application screen" and display the third summary message 1403*c*, instead of displaying a message item including a part of the text "[XX Card] 13000 won was Paid in the Supermarket" in the message application screen displayed on the display 1460.

Figure 15:
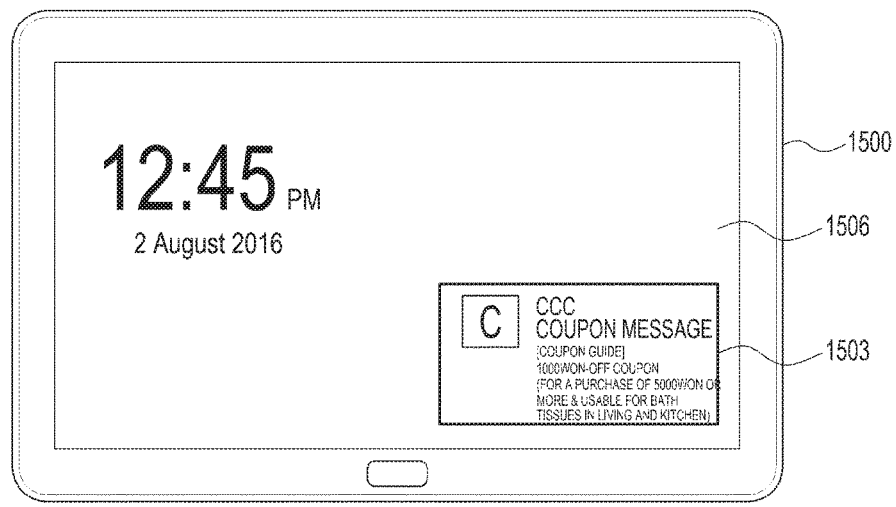
FIG. 15 is a view illustrating a method for determining a notification scheme according to display status information about a smart tablet according to an embodiment of the present disclosure.

FIG. 15 is a view illustrating a method for determining a notification scheme based on display status information about a smart tablet according to an embodiment of the present disclosure.

Referring to FIG. 15, according to various embodiments, an electronic device 1500 may be a smart tablet. For example, the following description is given on the assumption that the smart tablet has a larger display size than the smartphone illustrated in FIG. 2.

According to various embodiments, a controller (for example, the controller 520*a* or 520*b*) of the electronic device 1500 may obtain display status information indicating that a display size of a display 1506 of the smart tablet is larger than a pre-stored first display size (for example, a display size of a smartphone).

According to various embodiments, the controller 520*a* or 520*b* may determine "display with details" as a notification scheme based on the display status information indicating that the display size of the display 1506 of the smart tablet is larger than the display size of a smartphone.

According to various embodiments, the controller 520*a* or 520*b* may obtain a summary message 1503 saying "CCC Coupon Message/[Coupon Guide]/1000 won-Off Coupon/(For A Purchase of 5000 won or More & Usable for Bath Tissues in Living and Kitchen)" including all of text of a received message saying "CCC Coupon Message/[Coupon Guide]/1000 won-Off Coupon/(For A Purchase of 5000 won or More & Usable for Bath Tissues in Living and Kitchen)," according to the notification scheme, "display with details."

According to various embodiments, the controller 520*a* or 520*b* may display the summary message 1503 saying "CCC Coupon Message/[Coupon Guide]/1000 won-Off Coupon/(For A Purchase of 5000 won or More & Usable for Bath Tissues in Living and Kitchen)" on the display 1506 of the smart tablet with the size 1506 larger than that of a smartphone.

Figure 16:
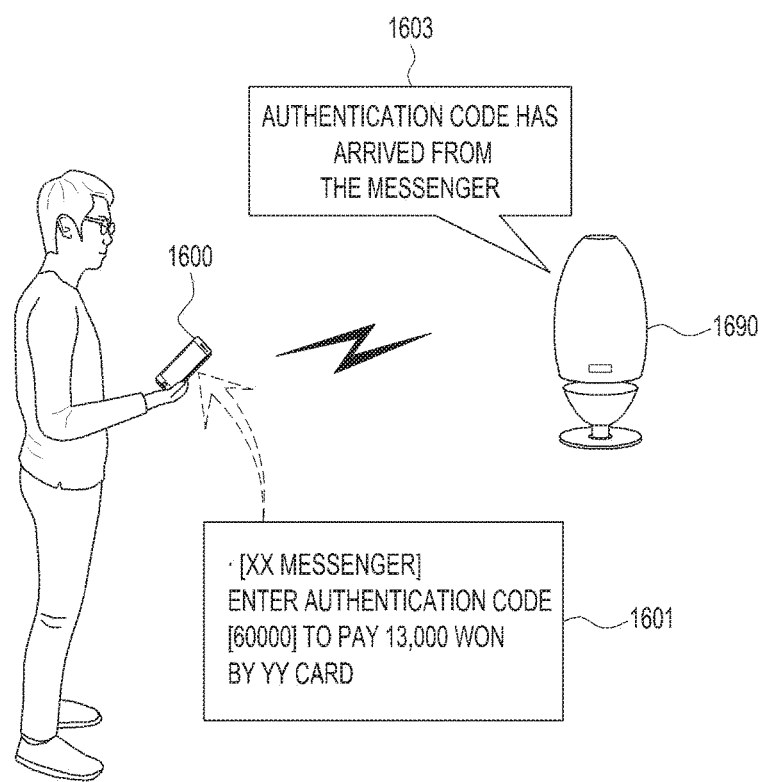
FIG. 16 is a view illustrating a method for determining a notification scheme according to an output status according to an embodiment of the present disclosure.

FIG. 16 is a view illustrating a method for determining a notification scheme according to an output status according to an embodiment of the present disclosure.

Referring to FIG. 16, according to various embodiments, an electronic device 1600 may be connected to an external speaker 1690 by wireless communication. For example, if the electronic device 1600 is connected to the speaker 1690 by wireless communication, the electronic device 1600 may control the speaker 1690 to output a specific sound. For example, the electronic device 1600 may control the speaker 1690 to output text of a specific message received by the electronic device 1600, by voice.

According to various embodiments, the electronic device 1600 may receive a message 1601 saying "[XX Messenger] Enter Authentication code [60000] to Pay 13,000 won by YY Card" from the outside.

According to various embodiments, a controller (for example, the controller 520*a* or 520*b*) may determine "output without important information" as a notification scheme for the message 1601 saying "[XX Messenger] Enter Authentication code [60000] to Pay 13,000 won by YY Card" based on an output status corresponding to output of a voice message through the speaker 1600.

According to various embodiments, the controller 520*a* or 520*b* may convert the message 1601 saying "[XX Messenger] Enter Authentication code [60000] to Pay 13,000 won by YY Card" to a summary message 1603 saying "Authentication code Has Arrived From the Messenger" according to the notification scheme "output without important information."

According to various embodiments, the controller 520*a* or 520*b* may output the summary message 1603 saying "Authentication code Has Arrived from the Messenger" through the speaker 1690 by voice.

Figure 17:
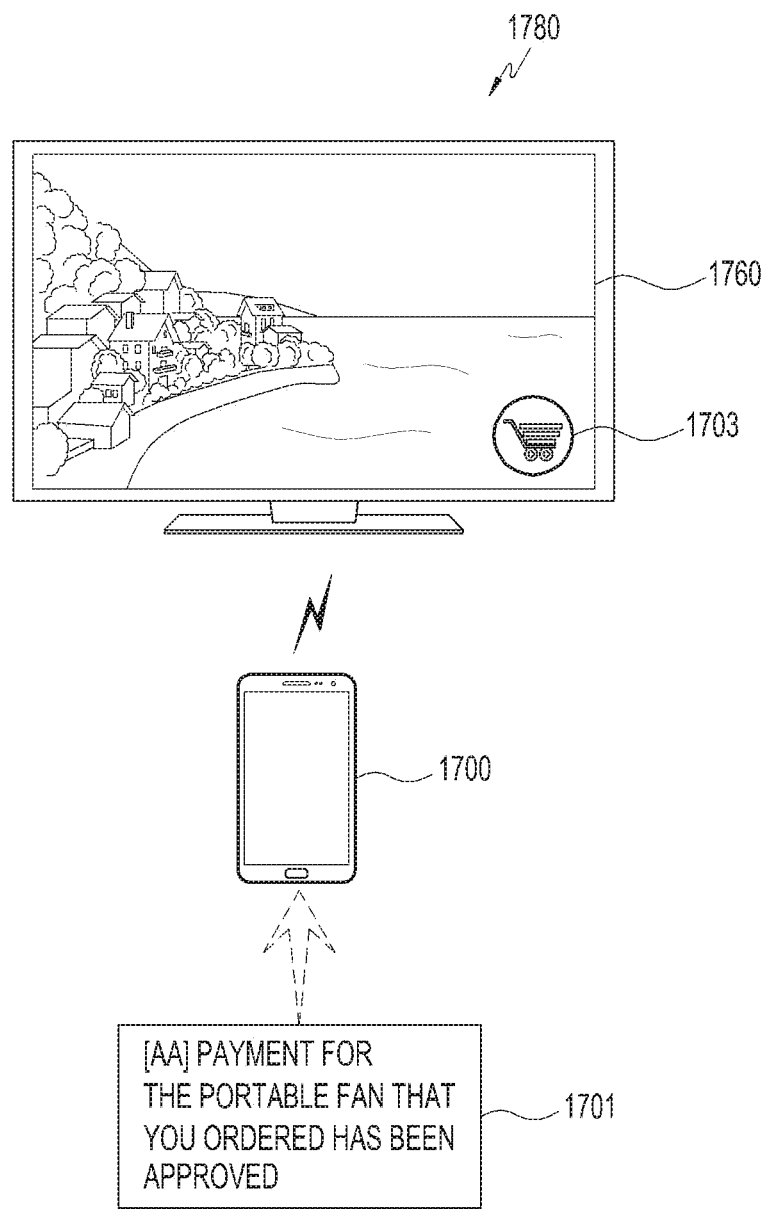
FIG. 17 is a view illustrating a method for determining a notification scheme according to display status information according to an embodiment of the present disclosure.

FIG. 17 is a view illustrating a method for determining a notification scheme based on display status information according to an embodiment of the present disclosure.

Referring to FIG. 17, according to various embodiments, an electronic device 1700 may be connected to an external smart TV 1780 by wireless communication. For example, if the electronic device 1700 is connected to the smart TV 1780 by wireless communication, the electronic device 1700 may control a display 1760 of the smart TV 1780 to output a specific image. For example, the electronic device 1700 may control the display 1760 of the smart TV 1780 to output a specific message received by the electronic device 1700 in a determined notification scheme.

According to various embodiments, while content transmitted from the electronic device 1700 by wireless communication is displayed on the display 1760 of the smart TV 1780, the electronic device 1700 may receive a message 1701 saying that "[AA] Payment for the Portable Fan that You Ordered Has Been Approved" from the outside.

According to various embodiments, a controller (for example, the controller 520*a* or 520*b*) of the electronic device 1700 may determine "display only simple icon" as a notification scheme based on display status information about the smart TV 1780, indicating that content is displayed on the display 1760 of the smart TV 1780 before display of the message 1701.

According to various embodiments, the controller 520*a* or 520*b* may convert the message 1701 to a summary message 1703 including only an icon according to the notification scheme "display only simple icon," and display the summary message 1703 including only the icon on the display 1760 of the smart TV 1780.

Figure 18:
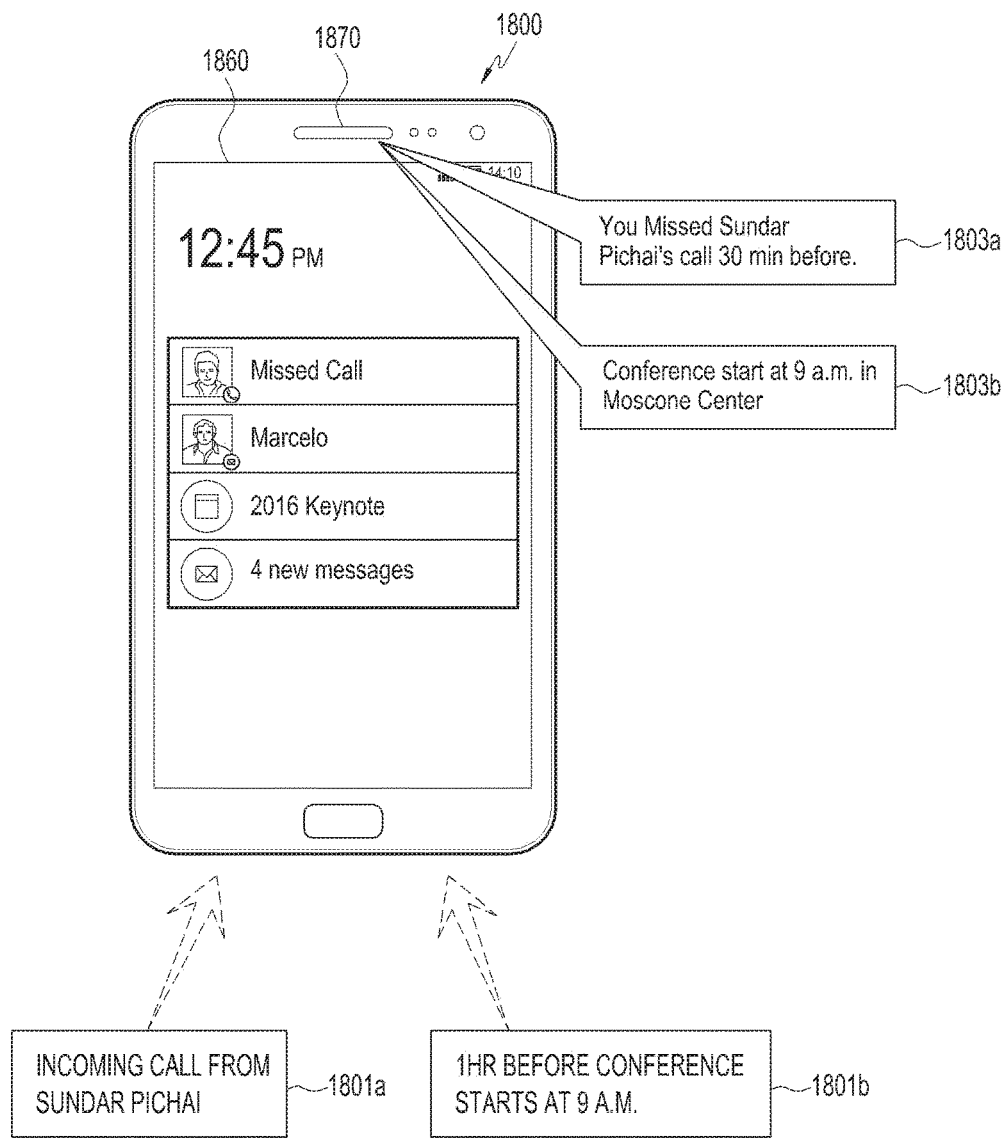
FIG. 18 is a view illustrating a method for determining a notification scheme in a screen locked status according to an embodiment of the present disclosure.

FIG. 18 is a view illustrating a method for determining a notification scheme in a screen locked status according to an embodiment of the present disclosure.

Referring to FIG. 18, according to various embodiments, a controller (for example, the controller 520*a* or 520*b*) may display a locked screen on a display 1860. For example, the locked screen may display at least one notice event corresponding to each of at least one application.

According to various embodiments, an electronic device 1800 may obtain a notice event 1801*a* corresponding to a phone application, "An Incoming Call from Sundar Pichai."

According to various embodiments, the controller 520*a* or 520*b* may determine "colloquial style" as a notification scheme for the notice event 1801*a* corresponding to the phone application, "An Incoming Call from Sundar Pichai" based on the display status information indicating "screen locked" and the notice event 1801*a* corresponding to the phone application, "An Incoming Call from Sundar Pichai."

According to various embodiments, the controller 520*a* or 520*b* may convert the notice event 1801*a* corresponding to the phone application, "An Incoming Call from Sundar Pichai" to a summary message 1803*a* of colloquial style saying "You Missed Sundar Pichai's Call 30 Min Before" according to the notification scheme, "colloquial style."

According to various embodiments, the controller 520*a* or 520*b* may output the summary message 1803*a* of colloquial style saying "You Missed Sundar Pichai's Call 30 Min Before" through a speaker 1870.

According to various embodiments, the electronic device 1800 may obtain a notice event 1801*b* corresponding to a scheduling application, "1 Hr Before the Conference Starts at 9 A.M. in Moscone Center."

According to various embodiments, the controller 520*a* or 520*b* may determine "colloquial style" as a notification scheme for the notice event 1801*b* corresponding to the scheduling application, "1 Hr Before the Conference Starts at 9 A.M. in Moscone Center" based on the display status information indicating "screen locked" and the notice event 1801*b* corresponding to the scheduling application, "1 Hr Before the Conference Starts at 9 A.M. in Moscone Center."

According to various embodiments, the controller 520*a* or 520*b* may convert the notice event 1801*a* corresponding to the scheduling application, "1 Hr Before the Conference Starts at 9 A.M. in Moscone Center" to a summary message 1803a of colloquial style saying "Conference Starts at 9 A.M. in Moscone Center" in the notification scheme, "colloquial style."

According to various embodiments, the controller 520a or 520b may output the summary message 1803b of colloquial style saying "Conference Starts at 9 A.M. in Moscone Center" through the speaker 1870.

Figure 19:
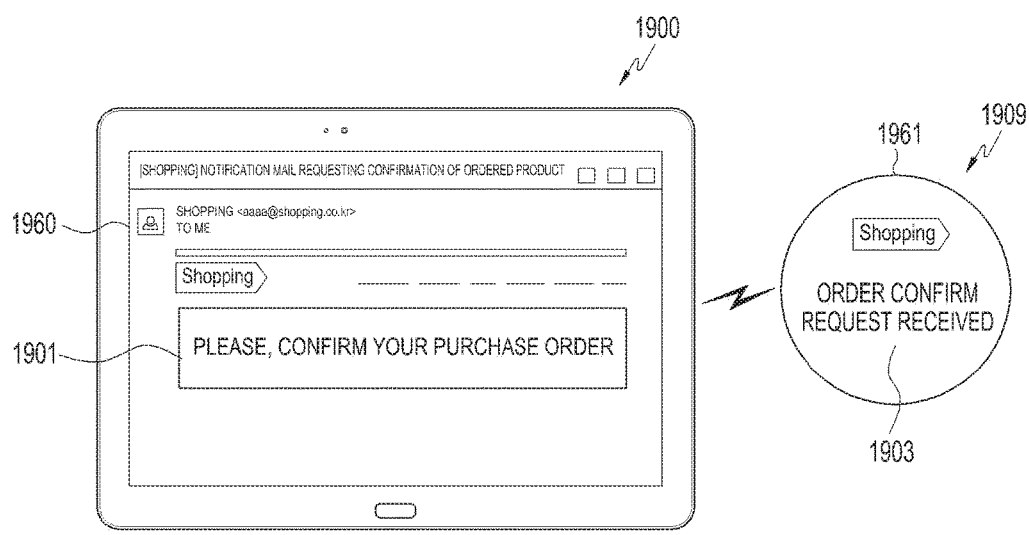
FIG. 19 is a view illustrating a method for determining a notification scheme in a circular display status according to an embodiment of the present disclosure.

FIG. 19 is a view illustrating a method for determining a notification scheme in the status of circular display according to an embodiment of the present disclosure.

Referring to FIG. 19, according to various embodiments, an electronic device 1900 being a smartphone may be connected to an electronic device 1909 being a smart watch by wireless communication.

According to various embodiments, a controller (for example, the controller 520a or 520b) of the electronic device 1900 may receive an external mail 1901 including text "Please, Confirm Your Purchase Order." For example, the controller 520a or 520b may display the full mail 1901 including the text "Please, Confirm Your Purchase Order" on a display 1960 of the electronic device 1900.

According to various embodiments, the controller 520a or 520b may convert the mail 1901 including the text "Please, Confirm Your Purchase Order" to a summary mail and transmit the summary mail to the connected electronic device 1909 by wireless communication.

According to various embodiments, the controller 520a or 520b may obtain display status information indicating "circular display" from the connected electronic device 1909 by wireless communication.

According to various embodiments, the controller 520a or 520b may determine "only important information in brief" as a notification scheme for the event that the mail 1901 including the text "Please, Confirm Your Purchase Order" has been received.

According to various embodiments, the controller 520a or 520b may convert the event that the mail 1901 including the text "Please, Confirm Your Purchase Order" has been received to a summary mail 1903 stating "Order Confirm Request Received" based on the notification scheme "only important information in brief" For example, the summary mail 1903 stating "Order Confirm Request Received" may include an icon "shopping" corresponding to a sender of the mail 1901.

According to various embodiments, the controller 520a or 520b may display the summary mail 1903 including the icon "shopping" on a circular display 1961 of the electronic device 1909.

As is apparent from the foregoing description, an electronic device according to various embodiments of the present disclosure can display important information of a message or an event in a limited display space of a small display.

Since the electronic device can notify a user of a received message or event in a manner optimized to a user status, the user can readily view important information of the message or event without the need for manipulating a user interface of the electronic device a plurality of times.

Further, even when the user is working out or driving, the user can view a full message or important information included in the contents of a notice event without selecting a message or notice event displayed on a display.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a transceiver; and
at least one processor configured to:
identify a notification scheme for outputting a message received by the transceiver based on a message type of the message and status information about the electronic device,
obtain a summary message by converting the message according to the notification scheme, and
control to output the summary message according to the notification scheme.
2. The electronic device of claim 1, wherein the at least one processor is further configured to:
obtain sender information of the message, and
identify the notification scheme based on the sender information and the status information.
3. The electronic device of claim 1,
wherein the at least one processor is further configured to identify the message type of the message, and
wherein the identifying of the message type comprises analyzing the message with a natural language analyzer.
4. The electronic device of claim 1, wherein the at least one processor is further configured to:
obtain importance information from the message, and
convert the message according to the importance information.
5. The electronic device of claim 1, wherein the notification scheme comprises one of a summary by item, an icon of a card used, a summary in colloquial style, or an icon of a sender of the message.
6. The electronic device of claim 1,
wherein a display is configured to output the summary message,
wherein the status information includes display status information related to the display, and
wherein the at least one processor is further configured to:
identify a length of the summary message based on the display status information, and
convert the message to the summary message according to the identified length.
7. The electronic device of claim 1, wherein the status information includes user status information related to a user of the electronic device.
8. The electronic device of claim 7, wherein the at least one processor is further configured to:
output the summary message by audio based on the user status information, and
output the summary message by audio based on the user status information or an operation mode of the electronic device.
9. The electronic device of claim 8,
wherein the operation mode includes a drive mode, and
wherein the at least one processor is further configured to control to output, when the operation mode of the electronic device is the drive mode, the summary message by audio.
10. The electronic device of claim 1, wherein the notification scheme determines whether to ignore the summary message, output the summary message by audio, stop other tasks, display the summary message on a display of the electronic device, or display the summary message on a display of an external device connected to the electronic device.
11. A method for controlling an electronic device, the method comprising:
receiving a message;
identifying a notification scheme for outputting the message based on a message type of the message and status information about the electronic device;

obtaining a summary message by converting the message according to the notification scheme; and outputting the summary message according to the notification scheme.

12. The method of claim 11, further comprising obtaining sender information of the message,
wherein the identifying of the notification scheme comprises identifying the notification scheme based on the sender information and the status information.

13. The method of claim 11, further comprising identifying the message type of the message,
wherein the identifying of the notification scheme comprises identifying the notification scheme based on the message type and the status information, and
wherein the identifying of the message type comprises analyzing the message with a natural language analyzer.

14. The method of claim 11, further comprising:
obtaining importance information from the message; and
converting the message according to the importance information.

15. The method of claim 11, wherein the notification scheme comprises one of a summary by item, an icon of a card used, a summary in colloquial style, or an icon of a sender of the message.

16. The method of claim 11,
wherein the summary message is output on a display,
wherein the status information includes display status information related to the display, and
wherein the obtaining of the summary message comprises:
identifying a length of the summary message based on the display status information, and
converting the message to the summary message according to the identified length.

17. The method of claim 11, wherein the status information includes user status information about a user of the electronic device.

18. The method of claim 17, wherein the outputting of the summary message includes outputting the summary message by audio based on the user status information.

19. An electronic device comprising:
a transceiver; and
at least one processor configured to:
obtain status information about the electronic device,
convert, if the electronic device is in a first status and a message type of a message is a first type, the message received by the transceiver to a first summary message and output the first summary message, and
convert, if the electronic device is in a second status and the message type of the message is a second type, the message received by the transceiver to a second summary message and output the second summary message.

20. A non-transitory computer-readable recording medium storing a program executable by a computer, the program including executable instructions which, when executed by at least one processor of an electronic device, control the electronic device to perform:
receiving a message;
identifying a notification scheme for outputting the message based on a message type of the message and status information about the electronic device;
obtaining a summary message by converting the message according to the notification scheme; and
outputting the summary message according to the notification scheme.

* * * * *